United States Patent
Kaplan et al.

(10) Patent No.: US 11,496,327 B1
(45) Date of Patent: Nov. 8, 2022

(54) SECURE AND TRUSTWORTHY BRIDGE FOR TRANSFERRING ASSETS ACROSS DIFFERENT NETWORKS

(71) Applicant: Ava Labs, Inc., New York, NY (US)

(72) Inventors: Michael Edmond Kaplan, Brooklyn, NY (US); Conor Leary, Denver, CO (US); Nicholas Mussallem, San Rafael, CA (US); Emin Gun Sirer, New York, NY (US); Bernard Wong, Waterloo (CA)

(73) Assignee: Ava Labs, Inc., New York, NY (US)

( * ) Notice: Subject to any disclaimer, the term of this patent is extended or adjusted under 35 U.S.C. 154(b) by 0 days.

(21) Appl. No.: 17/727,561

(22) Filed: Apr. 22, 2022

Related U.S. Application Data

(60) Provisional application No. 63/219,329, filed on Jul. 7, 2021.

(51) Int. Cl.
   *H04L 9/00* (2022.01)
   *H04L 9/30* (2006.01)

(52) U.S. Cl.
   CPC . *H04L 9/50* (2022.05); *H04L 9/30* (2013.01)

(58) Field of Classification Search
   None
   See application file for complete search history.

(56) References Cited

U.S. PATENT DOCUMENTS

| | | | |
|---|---|---|---|
| 2019/0034920 A1* | 1/2019 | Nolan | H04L 9/3239 |
| 2019/0306235 A1* | 10/2019 | Veale | H04L 9/3239 |
| 2020/0310789 A1 | 10/2020 | Zhou et al. | |

OTHER PUBLICATIONS bitpay.com [online], "How to accelerate incoming bitcoin transactions (Child Pays for Parent)," Sep. 2021, retrieved on May 5, 2022, retrieved from URL<https://support.bitpay.com/hc/en-us/articles/360049872312-How-to-accelerate-incoming-bitcoin-transactions-Child-Pays-For-Parent-#:~:text-Bitcoin' s%20Child%20Pays%20For%20Parent, difference%20on%20the%20parent's%20behalf>, 8 pages.

github.com [online], "estimatesmartfee always returns "Insufficient data or no feerate found" #11500," Oct. 15, 2017, retrieved on May 5, 2022, retrieved from URL<https://github.com/bitcoin/bitcoin/issues/11500>, 9 pages.

PCT International Search Report and Written Opinion in International Application No. PCT/US2022/036307, dated Aug. 15, 2022, 7 pages.

* cited by examiner

*Primary Examiner* — Brandon Hoffman
(74) *Attorney, Agent, or Firm* — Fish & Richardson P.C.

(57) ABSTRACT

Described herein are systems and methods for providing the secure transfer of assets between blockchain networks. The system can include a storage device that can store a bridge program that is programmed to perform (i) lock operations that lock native assets from a first blockchain network and mint synthetic assets representing the native assets in a second blockchain network, and (ii) unlock operations that unlock the native assets by transferring the native assets to an address in the first blockchain network in response to the synthetic assets being returned or destroyed. The system can include a computer system that loads and executes the bridge program in a secure computing enclave that provides a trusted execution environment. The computer system can then perform the lock operations and the unlock operations to provide a bridge between the first blockchain network and the second blockchain network.

20 Claims, 17 Drawing Sheets

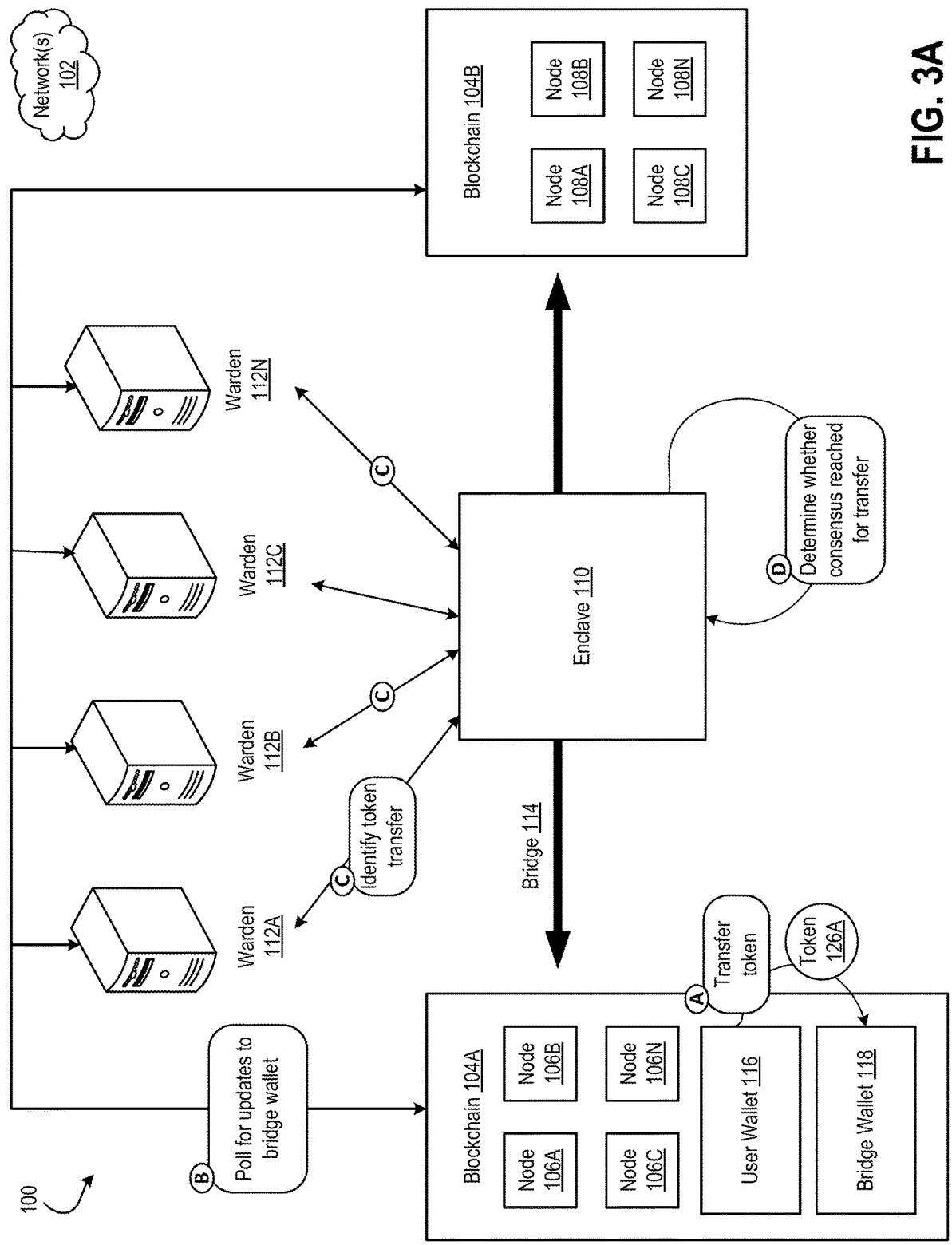

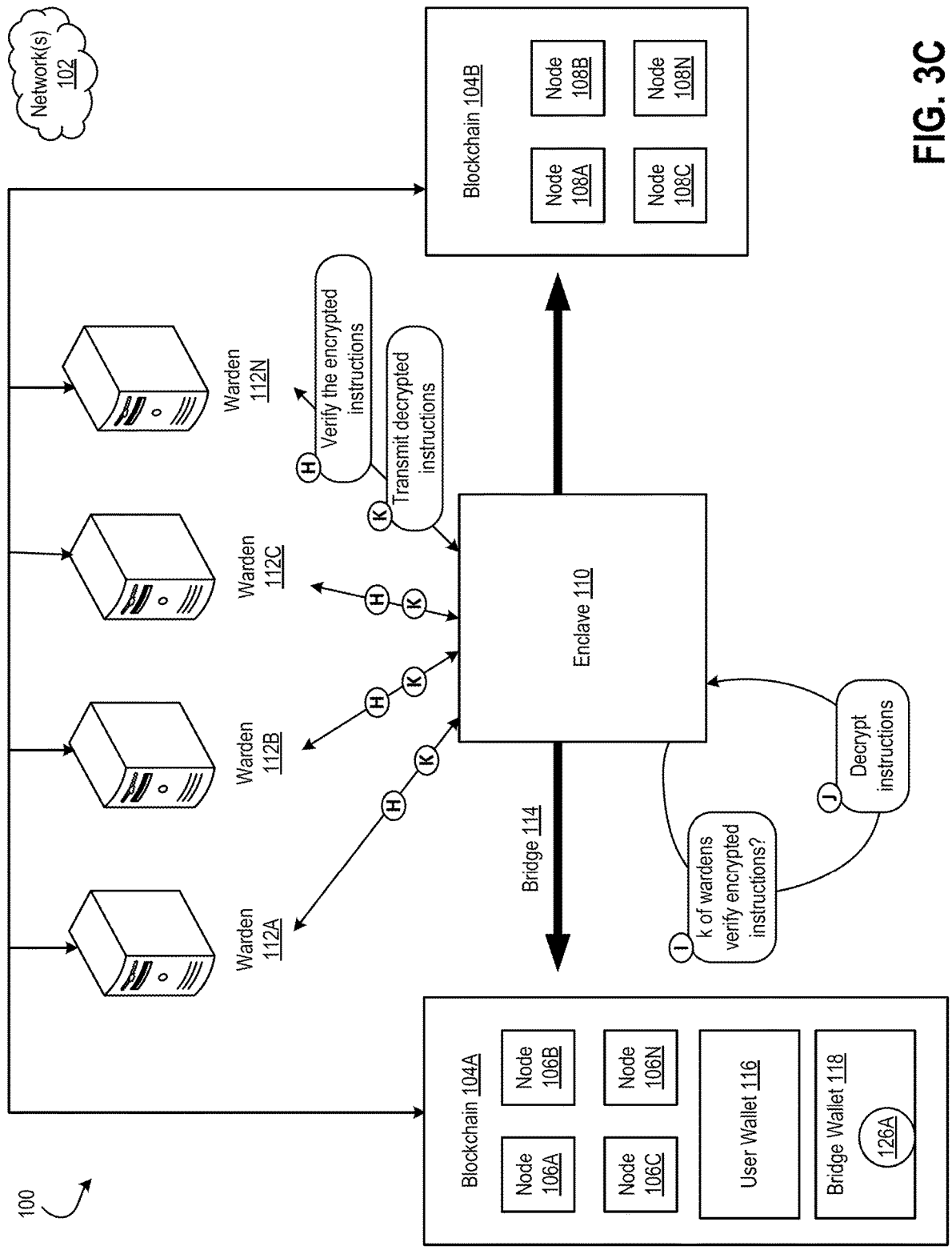

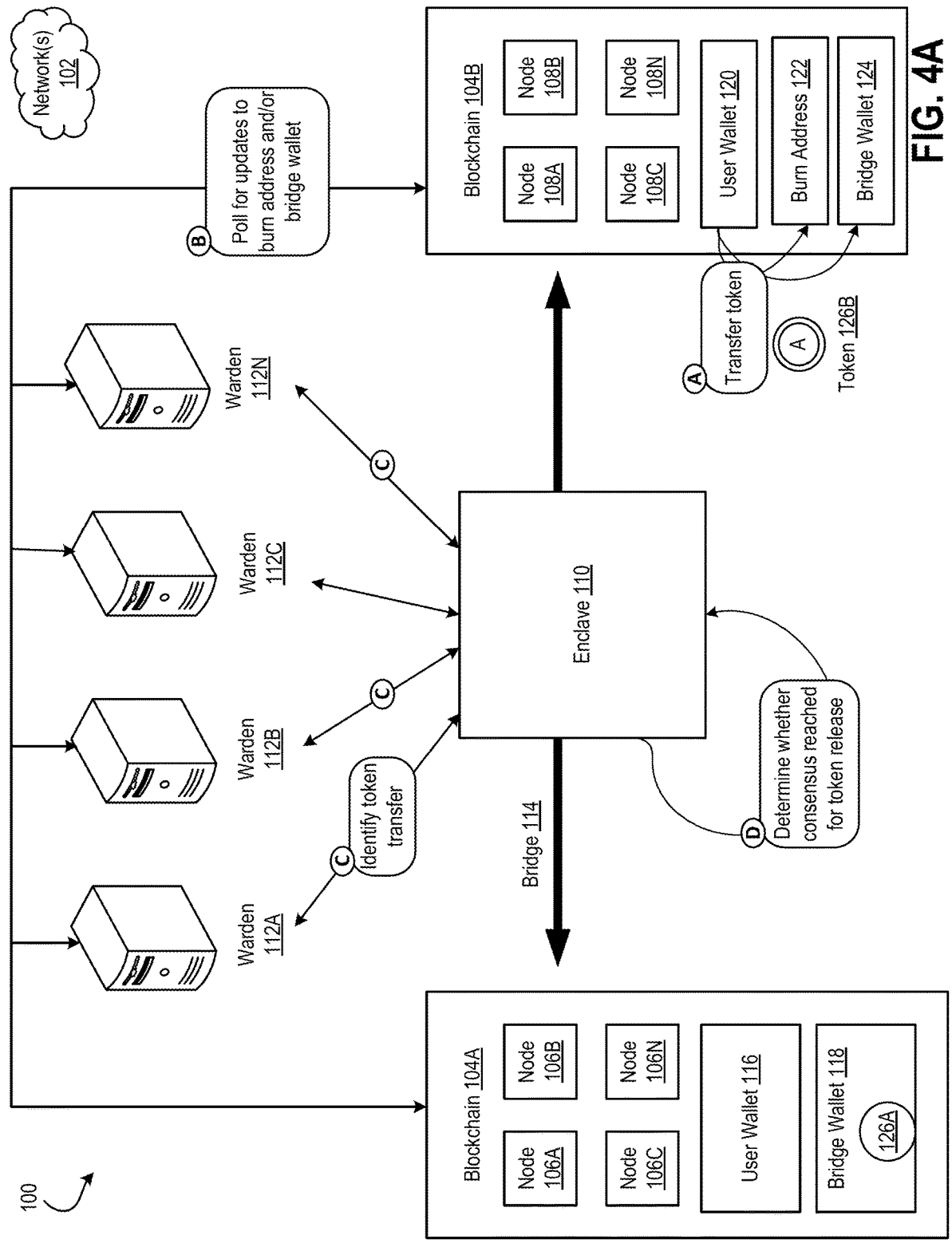

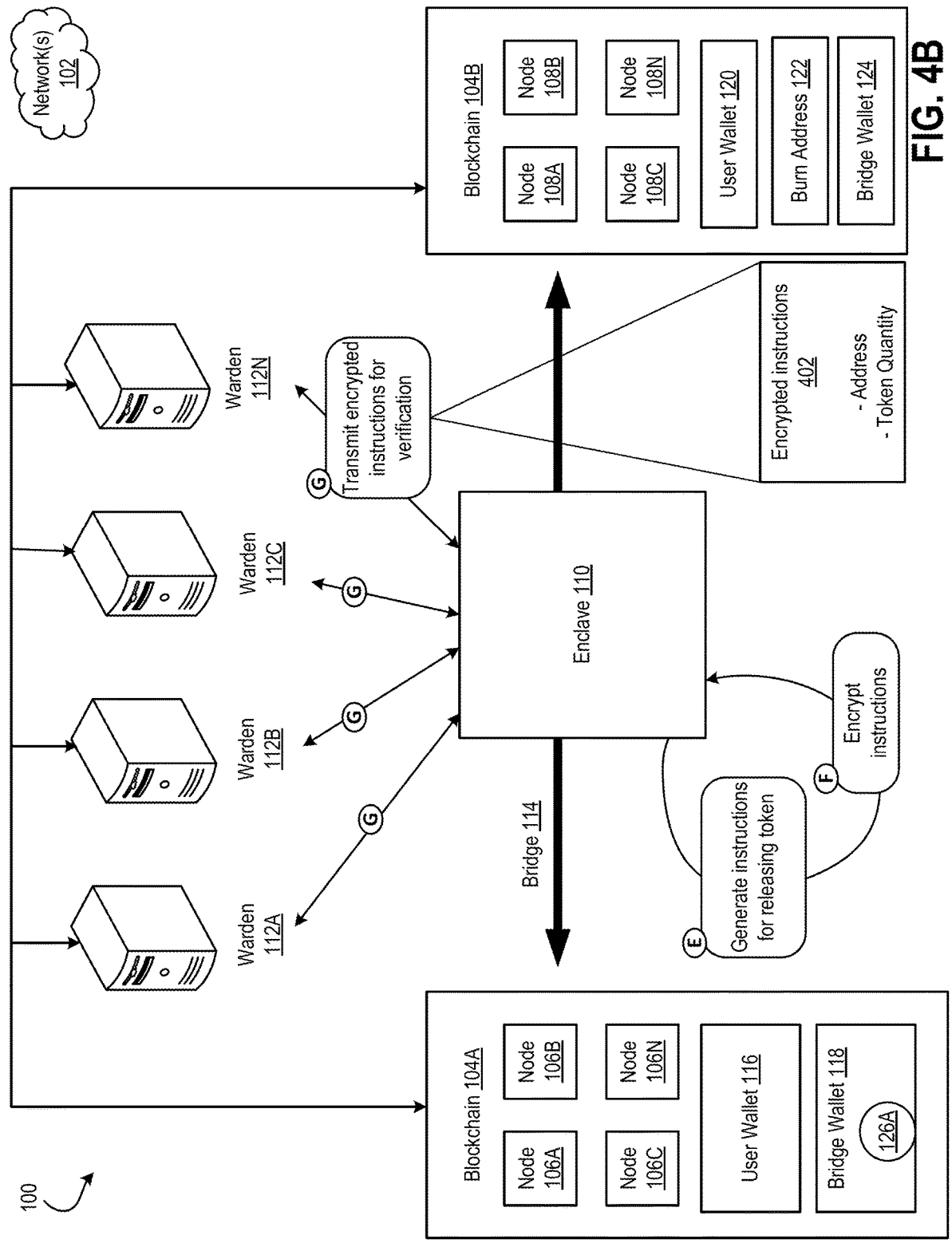

SECURE AND TRUSTWORTHY BRIDGE FOR TRANSFERRING ASSETS ACROSS DIFFERENT NETWORKS

CROSS-REFERENCE TO RELATED PATENT APPLICATIONS

This application claims the benefit of U.S. Provisional Application No. 63/219,329 filed on Jul. 7, 2021, the contents of which are incorporated by reference herein.

TECHNICAL FIELD

This document generally describes devices, systems, and methods related to transferring assets from one network to another using a secure enclave environment.

BACKGROUND

A variety of computer systems have been developed to provide electronic exchanges that permit for and process transactions among market participants. For example, centralized and decentralized exchanges have been developed that permit for digital assets to be traded between market participants. Centralized exchanges can include, for example, a centralized ledger that is maintained by a centralized host to track and resolve asset ownership among market participants. Decentralized exchanges can include, for example, multiple ledgers that are maintained across multiple different hosts that, together, reconcile and resolve asset ownership among the market participants through consensus processes. Decentralized exchanges have been implemented using blockchain technology. Each blockchain can have a different exchange, asset, digital currency, cryptocurrency, or other type of token. To transfer assets from one blockchain or network to another, a user may pay significant transfer fees. Sometimes, these transfer fees can cost more than an amount of assets that are being transferred. Moreover, in some implementations, the user may not be able to transfer assets from one blockchain to another because the blockchains do not support cross-chain transfers.

Various secure computing environments have been developed, which can protect various aspects of processes within the secure computing environments from observation, detection, or manipulation by third party actors (e.g., malware). For example, secure computing enclaves have been developed that include hardware components of computing devices that provide operations to execute code in an encrypted environment that can shield the operations and/or data being processed from third party actors. For instance, a computing device can include one or more specialized processors that are configured to allow user-level and/or operating system code to define private and encrypted regions of memory, sometimes called enclaves.

SUMMARY

The document relates to secure and trustworthy computing bridges, or environments, to provide for transfer of tokens, cryptocurrencies, and/or other digital assets. The disclosed technology provides for building a bridge between two or more blockchains and operating that bridge through a trustless yet secure environment such as an enclave. Because the enclave is trustless and secure, the bridge may not be exploited by an operator of the enclave and/or bridge, nor may the bridge be exploited by third party actors or malicious entities. The bridge described herein can simplify an asset transfer process by transferring assets between wallets with a same address but on their respective blockchains. For example, the bridge can provide for transfer of quantities of tokens from a first blockchain to a second blockchain. The quantity of tokens on the first blockchain can be transferred from the user's wallet on the first blockchain to a bridge wallet on that same blockchain. The bridge can facilitate minting a token (e.g., wrapping the token) on the second blockchain and putting that minted token in the user's wallet on the second blockchain. The token can be minted in a quantity that corresponds to the quantity of the token that was transferred into the bridge wallet of the first blockchain. As a result, the user can control both wallets on both blockchains using a same private key, thereby reducing likelihood that the token quantities may be minted to the wrong wallet. In some implementations, the disclosed technology can also provide for transferring token quantities between wallets with different addresses. In general, the disclosed technology can provide a low cost, low latency, and secure means to transfer assets from one blockchain to another or between one or more other networks.

In some implementations, assets from a first blockchain can be transferred to an address controlled by the bridge (e.g., the assets or token can be transferred from a user wallet into a bridge wallet on the first blockchain), and the enclave (the secure environment) can mint an equal amount of a corresponding token on a second blockchain to a same address that sent the token on the first blockchain. Moreover, in some implementations, a wrapped token can be burned on the second blockchain. The wrapped token can be sent to a burn address and/or a bridge wallet on the second blockchain. Burning the wrapped token on the second blockchain can cause the wrapped token to no longer be available for use. Accordingly, the enclave can validate instructions that cause the corresponding quantity of tokens in the bridge wallet on the first blockchain to be released back to the user wallet on the first blockchain. The bridge operating through the secure enclave can operate like a cross-chain smart contract.

The enclave can be verified via remote attestation by one or more third party actors to ensure that the enclave is valid and secure. For example, one or more wardens can be anonymous nodes that are tasked with verifying that the enclave is operating securely. The wardens can also be tasked with monitoring state changes to the blockchains in order to determine when minting and/or burning have been initiated on the respective blockchains. The wardens can verify that the enclave is operating in a valid and secure environment using remote attestation. One or more other entities, such as users that transfer tokens across the blockchains can also perform remote attestation of the enclave and/or request that the wardens perform remote attestation.

One or more embodiments described herein can include a system for providing the secure transfer of assets between blockchain networks. The system can include a storage device that can store a bridge program and that is programmed to perform (i) lock operations that lock native assets from a first blockchain network and mint synthetic assets representing the native assets in a second blockchain network, and (ii) unlock operations that unlock the native assets by transferring the native assets to an address in the first blockchain network in response to the synthetic assets being returned or destroyed. The system can also include a computer system that can load and execute the bridge program, including performing the lock operations and the unlock operations to provide a bridge between the first blockchain network and the second blockchain network.

In some implementations, the embodiments described herein can optionally include one or more of the following features. For example, the computer system can include a secure computing enclave that can provide a trusted execution environment within which processing of programs is secure from observation and manipulation by other operations outside of the secure enclave. Execution of the bridge program in the secure enclave can include loading the bridge program from the storage device into secure memory within the secure enclave, performing an attestation operation on the bridge program loaded into the secure memory within the secure enclave, the attestation operation being configured to validate the bridge program, and outputting results of the attestation operation to identify whether the bridge program loaded in the secure enclave is valid.

As another example, the bridge program can be stored in the storage device, the secure enclave can be programmed to generate a signature of the bridge program loaded into the secure memory, and the signature of the bridge program loaded into the secure memory can be used to verify the bridge program as part of the attestation operation. Moreover, performing the attestation operation can include performing a hash operation on at least a portion of the bridge program in the secure memory to generate the signature, and the results can comprise the signature including a hash value generated by performing the hash operation.

As another example, one or more other computing devices can be programmed to request the attestation operation be performed and to compare the results against a validated attestation value stored on a third party server system for the bridge program.

Sometimes, first wallets on the first blockchain network can include first private keys and first public keys, second wallets on the second blockchain network can include second private keys and second public keys, and the first private keys can be the same as the second private keys across the first blockchain network and the second blockchain network. Sometimes, the first public keys for the first wallets can be the same as the second public keys for the second wallets. Other times, the first public keys for the first wallets can be different from the second public keys for the second wallets. As yet another example, the second public keys associated with the second private keys for the second wallets can be recovered from first signatures associated with transactions with the first wallets on the first blockchain network. In some implementations, the second public keys for the second wallets can include a minting address to receive the minted synthetic assets on the second blockchain network can be configured to be determined by the bridge program using the public key recovered from the first signatures from the first wallet on the first blockchain network. As yet another example, the first public keys associated with the first private keys for the first wallets can be configured to be recovered from second signatures associated with transactions with the second wallets on the second blockchain network. Moreover, as another example, the first public keys for the first wallets can include the address for receiving the unlocked native assets on the first blockchain network can be configured to be determined by the bridge program using the second signatures from the second wallet on the second blockchain network.

As another example, remote warden systems that can each be configured to maintain a secret share of a private key for the bridge program that can be used to perform the lock operations and the unlock operations to lock the native assets and to mint synthetic assets. The secret shares maintained by each of the remote warden systems can be configured to be used in combination to regenerate the private key.

Sometimes, each of the remote warden systems can also store a portion of a pool of shared secrets that, collectively, are capable of being used to instantiate a new instance of the bridge program, and in the event that a first instance of the bridge program fails, to provide the portion of the pool of shared secrets to a second instance of the bridge program upon instantiation.

Moreover, each of the remote warden systems can be configured to provide the portion of the pool of shared secrets to the second instance of the bridge program in response to the second instance of the bridge program being validated using an attestation operation by the remote warden systems.

As another example, each of the remote warden systems can be configured to provide information related to the first blockchain network and the second blockchain network to the second instance of the bridge program.

As yet another example, the remote warden systems can be configured to receive an encrypted transaction from the bridge to confirm asset operations were performed on the first blockchain network and the second blockchain network, and the bridge program further can be configured to validate that the asset operations were successfully performed on the first blockchain network and the second blockchain network in response to receiving the confirmation from at least a threshold of the remote warden systems. Sometimes, the threshold can include at least a majority of the remote warden systems. Sometimes, the asset operations can include the native assets being transferred to a wallet associated with the bridge on the first blockchain network. In yet some implementations, the bridge program further can be configured to only mint the synthetic assets in response to at least the threshold of the remote warden systems confirming that the natives assets have been transferred to the wallet associated with the bridged in the first blockchain network.

Sometimes, the remote warden systems can be configured to automatically notify the bridge program of the native assets being transferred to the wallet associated with the bridge in the first blockchain network without prompting by the bridge program. Moreover, the asset operations can include the synthetic assets being minted on the second blockchain network. Sometimes, the asset operations can include the synthetic assets being returned or destroyed on the second blockchain network.

The bridge program can further be configured to only unlock the native assets in response to at least the threshold of the remote warden systems confirming that the synthetic assets have been returned or destroyed on the second blockchain network. Moreover, the remote warden systems can be configured to automatically notify the bridge program of the synthetic assets being returned or destroyed in the second blockchain network without prompting by the bridge program.

Sometimes, the asset operations can include the native assets being unlocked on the first blockchain network. Moreover, the bridge program can be configured to be modified by (i) generating a new private key associated with a new wallet for the bridge program, (ii) modifying on-chain smart contracts on one or more of the first blockchain network and the second blockchain network with regard to the new private key, and (iii) moving the native assets to the new wallet associated with the new private key.

As another example, the bridge program can be configured to execute a cross-chain smart contract during a cross-chain asset transfer, wherein the cross-chain smart contract is executed inside a secure enclave. Sometimes, the cross-chain smart contract can be configured to be used to perform on-chain operations on one or more of the first and second blockchain networks.

Moreover, fees can be collected for the lock operation and the unlock operation. In some implementations, the bridge program can further be configured to provide native coins to a wallet in the second blockchain network as part of the lock operation to pay network transaction fees in the second blockchain network. Sometimes, the bridge program further can be configured to provide native coins to a wallet in the first blockchain network as part of the unlock operation to pay network transaction fees in the first blockchain network. Sometimes, the fees can be determined based on the asset type, the quantity of assets being transferred, and network transaction fees. Sometimes, the fees for a transaction involving a wallet having credentials in the form of a non-fungible token (NFT) can be reduced.

As another example, the bridge program can further be configured to bidirectionally transfer assets between the first blockchain network and the second blockchain network. Sometimes, bidirectionally transferring assets can include the bridge program being configured to perform the lock operation on native assets in the second blockchain and to mint synthetic assets in the first blockchain, and to perform the unlock operation by unlocking native assets in the second blockchain in response to the synthetic assets in the first blockchain being returned or destroyed.

As yet another example, the bridge program can further be configured to transfer assets between more than two blockchain networks. Sometimes, the bridge program can further be configured to transfer synthetic assets between a plurality of different non-origin blockchain networks by burning a synthetic assets in a first non-origin blockchain network and minting a new synthetic assets in a second non-origin blockchain network. Sometimes, the bridge program can further be configured to unlock a corresponding native asset in an origin blockchain network in response to the new synthetic asset being returned or destroyed in the second non-origin blockchain network.

The devices, system, and techniques described herein may provide one or more of the following advantages. For example, the disclosed technology may be more secure and safe from security attacks than other networks. The disclosed technology may not include a public API. Since there is no user facing API, there may not be SSL certificates and verification, nor rate limiting. Due to this smaller attack surface, there may be limited or no exposure to DDOS attacks, thereby making the transfer of assets over the bridge through the enclave a more secure process. Since this process is more secure, users may have more trust in the enclave environment and may be more inclined to transfer assets using the bridge.

As another example, the disclosed technology provides for a simplified wallet structure. The enclave may manage one address on each of the blockchains that a bridge is built between. One address can therefore be used to identify the user's wallet on both blockchains. One address can also be used to identify the bridge's address on both blockchains. Using one address to identify the user's wallet on both blockchains can be advantageous to ensure that quantities of tokens or other assets are being transferred to the correct wallet. Use of the one address increases security of the disclosed techniques and increases trust that the users may have in the disclosed technology. Moreover, additional wallet structures may not be needed to move funds around to cover costs of transactions. As a result, the enclave can generate and send transactions while also reducing transaction fee costs in a simplified fashion.

The disclosed technology can also provide for a smaller trusted code base. The disclosed technology can provide for parsing transactions onto nodes such as wardens that are running outside of the enclave and that have fewer limitations than the enclave. As a result, responsibilities of the enclave can be at a minimum, which further can decrease risk of attacks from a security perspective.

Moreover, the disclosed technology may not require know-your-customer or anti-money laundering verifications. By construction, the disclosed technology can provide for moving assets that are held by a single individual. In other words, as described, assets can be transferred from the user's wallet on one blockchain to the user's wallet on another blockchain using the same address. The disclosed technology may not transmit funds to users that do not already have access to the assets. Thus, there may no longer be a need for know-your-customer and/or anti-money laundering verifications that may be needed for transferring assets between other blockchains or networks. This can further be beneficial to make a regulatory nature and operation of the bridge safer.

The disclosed technology can also provide one or more benefits to users. For example, some blockchains can impose gas prices that make interacting via smart contracts and transferring assets expensive and prohibitive. Sometimes, sending assets over a blockchain can cost more in transaction fees than the amount or quantity being moved. With the disclosed technology, the user may only pay transaction fees that cover gas for one transfer transaction on the first blockchain to wrap their assets, and then the gas for one transfer transaction on the second blockchain to unwrap or otherwise burn the assets. In some implementations, the bridge operator may charge a small fee to fund a cost of operation, however this fee may not be as prohibitively expensive as that of the blockchains or other networks. In some implementations, the disclosed technology can also provide for determining fee amounts based on current prices of assets that are being transferred. Therefore, the fee for going over the bridge can be a cost of gas for two transfers, one on each blockchain, in addition to a flat rate transfer fee amount for the bridge operator. The low fees for transfers can make adoption and use of the disclosed technology more desirable to users seeking to engage in exchanges on both blockchains.

User interaction with the bridge can also be simplified. A user can transfer tokens from their wallet on the first blockchain to a static address representing the bridge's wallet on the first blockchain. Wrapped tokens can be minted to the user's same wallet address but on the second blockchain. To unwrap the tokens, the user can send their wrapped tokens from their wallet on the second blockchain to a static burn address and/or bridge wallet on the second blockchain. The original tokens can then be sent back to the same wallet address on the first blockchain. This interface can be easy for users to learn and interact with and may not require the user to interact directly with the enclave, the wardens, and/or the bridge.

Remote attestation techniques can also be used to verify that the bridge is operating correctly. Remote attestation can ensure to users that no entity has access to manipulate the bridge or assets that are being transferred across the bridge, except for the code itself running in the enclave. Secure transactions can be performed and the users can trust the enclave using the disclosed techniques.

Moreover, the disclosed technology can provide for users to transfer tokens or other digital assets across different blockchains or networks. Traditionally, users may not be able to trade different digital assets across different networks. If the users could transfer or trade assets, then they may be charged significant transfer fees. As a result, users have limited ability to invest in different opportunities and ventures across different networks and exchanges. The disclosed technology, therefore, can permit users to move their digital assets across chains, thereby increasing the users' ability to invest in different opportunities and ventures.

The details of one or more implementations are set forth in the accompanying drawings and the description below. Other features and advantages will be apparent from the description and drawings, and from the claims.

BRIEF DESCRIPTION OF THE DRAWINGS

FIGS. 3A-D are conceptual diagrams of a process for minting tokens on a blockchain using the techniques described herein.

FIGS. 4A-D are conceptual diagrams of a process for releasing tokens on a blockchain using the techniques described herein.

Like reference symbols in the various drawings indicate like elements.

DETAILED DESCRIPTION OF ILLUSTRATIVE EMBODIMENTS

This document relates to a secure enclave environment for transferring assets, such as digital assets, tokens, and cryptocurrencies, across different networks. The networks can be different blockchains. The disclosed technology can provide a bridge between two or more blockchains, wherein the bridge operates within a secure and trusted enclave. Assets can be transferred between wallets with the same address but on their respective blockchains, thereby allowing a user to control both wallets using the same private key and reducing a likelihood that assets may be transferred to the wrong wallet. The disclosed technology operates like a cross-chain smart contract that can be verified through remote attestation via designated wardens (e.g., parties, entities, nodes). Since transfers of assets (e.g., smart contracts) can be made within a secure enclave environment, the transfers may not be altered by malicious actors. Furthermore, semi-trusted wardens can use remote attestation techniques to verify integrity of the enclave and any smart contracts being performed within the enclave. Since only the enclave, instead of a plurality of nodes, runs or executes smart contract transactions, it can become more feasible to have that enclave support transfers between different blockchains (e.g., networks).

Figure 1:
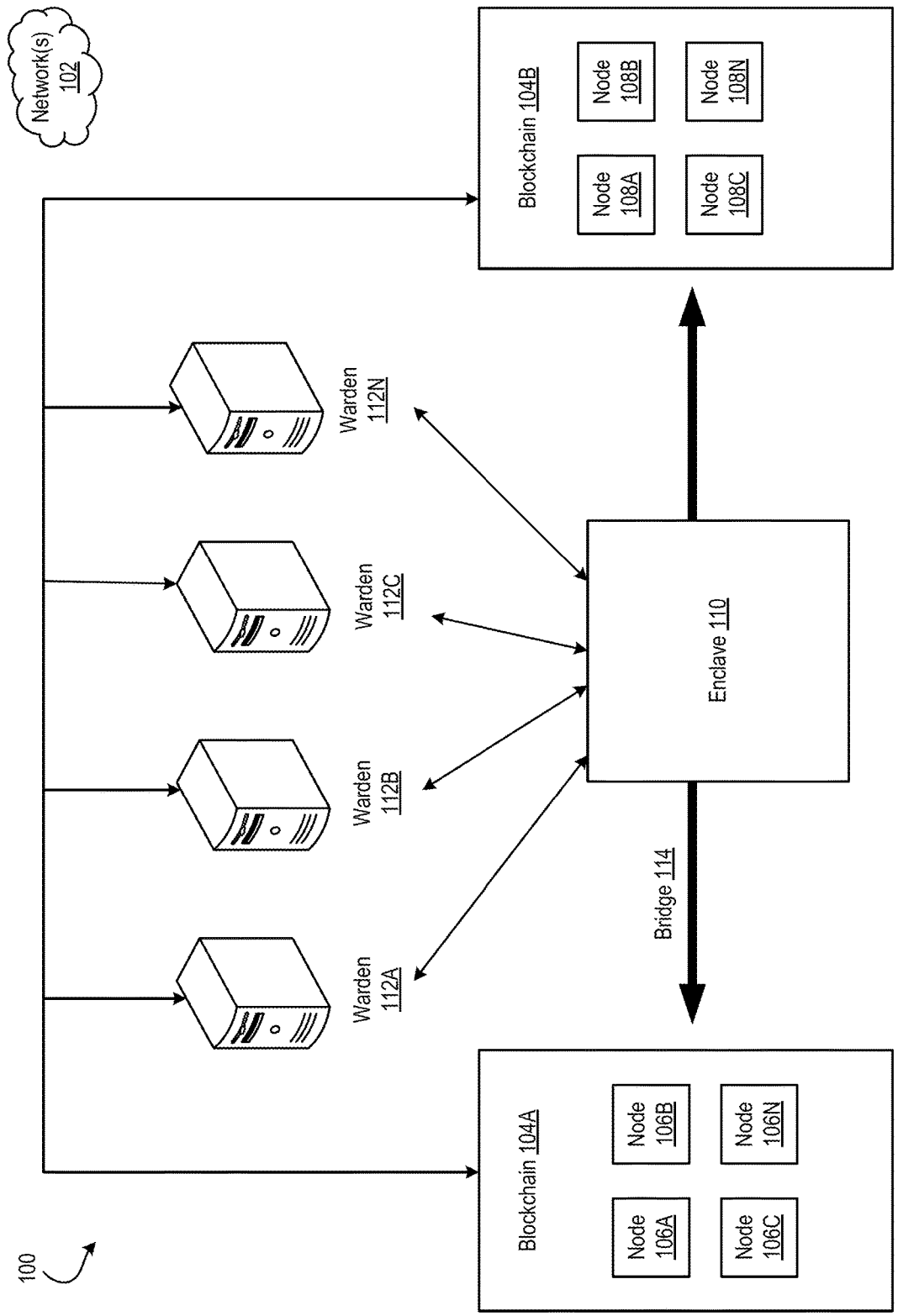
FIG. 1 is a conceptual diagram of a secure enclave environment for transferring tokens across blockchains.

Referring to the figures, FIG. 1 is a conceptual diagram of a secure enclave environment 100 for transferring tokens across blockchains. A first blockchain 104A and a second blockchain 104B can communicate via network(s) 102. The first blockchain 104A can include a plurality of nodes 106A-N. Each of the nodes 106A-N can communicate with each other and perform one or more operations in the first blockchain 104A. For example, the nodes 106A-N can transfer tokens from user wallets to a bridge wallet in the first blockchain 104A when a user seeks to transfer tokens, or a quantity of tokens, to the second blockchain 104B. The nodes 106A-N can also release tokens from the bridge wallet to the user wallet when a burn request is made and verified at the second blockchain 104B. Similarly, the second blockchain 104B can include a plurality of nodes 108A-N that can communicate with each other and perform one or more operations in the second blockchain 104B. For example, when the user burns tokens at the second blockchain 104B, the nodes 108A-N can release tokens from the user's wallet at the second blockchain 104B. The nodes 106A-N and 108A-N can be anonymous nodes that run the first and second blockchains 104A and 104B.

In some implementations, the first and second blockchains 104A and 104B can be any other type of network where assets can be generated, traded, stored, and/or used in transactions. Assets, such as tokens, can be transferred between the first and second blockchains 104A and 104B via bridge 114. Each of the blockchains 104A and 104B can have their unique digital assets, cryptocurrencies, and/or tokens.

An enclave 110 can provide for transferring of token quantities over the bridge 114 between the first and second blockchains 104A and 104B. The enclave 110 can exist between two or more blockchains or other networks. Although the enclave 110 can execute as its own standalone computing environment, the enclave 110 affects states of both the first and second blockchains 104A and 104B by issuing transactions (e.g., minting and burning).

The enclave 110 can be a secure computing environment that is operated on a server, computing system, and/or network of servers and/or computing systems. The enclave 110 can be stateless and constantly changing. This secure environment can be run by an operator. The same operator can also run the bridge 114. The operator can be anonymous. The enclave 110, when started up by the operator, can be verified using remote attestation to ensure that the right and secure code is being run by the right operator, as described further in reference to FIGS. 7-10. If, for example, the enclave 110 goes down, wardens 112A-N may independently of each other make a decision of whether the bridge 114 is responsive. Then, collectively, the wardens 112A-N can contact the operator of the enclave 110 and notify the operator that the bridge 114 needs to be fixed. Sometimes, the operator can shut down the enclave 110 or otherwise disappear/stop running the enclave 110. In such scenarios, the wardens 112A-N can collectively select another entity to become the operator of the enclave 110. In some implementations, the operator can be any one of the wardens 112A-N or any other entity operating within the secure enclave environment 100. When a new operator is selected, the wardens 112A-N can use their private shares of the master secret key for the enclave 110 in order to reassemble the master secret key that would be used by the operator to run the same code but in a new enclave. Thus, the transactions and activity from the enclave 110 can resume as if the enclave 110 never went down and a new operator was not selected.

The enclave 110 can permit for transfer of the tokens from one blockchain, such as the first blockchain 104A, to another blockchain, such as the second blockchain 104B. For example, a quantity of tokens from the first blockchain 104A can be minted on the second blockchain 104B such that that quantity of tokens can be used in an exchange on the second blockchain 104B.

In some implementations, the secure enclave environment 100 can provide for communication and transfer of assets between more than two blockchains. For example, the secure enclave environment 100 can provide for the bridge 114 between the first blockchain 104A and the second blockchain 104B as well as a second bridge between the second blockchain 104B and a third blockchain. One or more additional blockchains or other networks can also be bridged with one or more of the first and second blockchains 104A and 104B using the techniques described herein.

The secure enclave environment 100 can be composed of a trusted and untrusted codebase. The trusted codebase can be a portion of the codebase that runs within the enclave 110 and the untrusted code can run outside of the enclave 110. The untrusted code, for example, can be responsible for initializing and starting the enclave 110 as well as executing remote attestation of the enclave 110. Remote attestation, as described further below, is a process by which a third party can attest to a remote entity that it is trusted, and establish an authenticated communication channel with that entity. As part of attestation, the enclave 110 can prove its identity, that the source code has not been tampered with, that the enclave 110 is running on a genuine enabled platform with latest security updates.

As described herein, the enclave 110 can be responsible for processing on-chain events to support operations of the bridge 114. These events can include creation of smart contracts on the second blockchain 104B for minting wrapped tokens from the first blockchain 104A, minting assets on the second blockchain 104A, holding assets in a controlled wallet on the first blockchain 104A, and releasing tokens or other assets on the first blockchain 104A to designated addresses. One or more other on-chain events can be processed by the enclave 110.

The secure enclave environment 100 can also include a plurality of wardens 112A-N. The wardens 112A-N can be remote servers or other computing systems that are trusted partners of the enclave 110. The wardens 112A-N can be anonymous and in communication with the enclave 110 and the first and second blockchains 104A and 104B. The wardens 112A-N can monitor the first and second blockchains 104A and 104B for on-chain events, such as transferring tokens from a user's address to the bridge's wallet on the first blockchain 104A and releasing wrapped tokens on the second blockchain 104B. The wardens 112A-N can verify such on-chain events and broadcast instructions to execute the on-chain events at the respective blockchains.

Private keys for addresses used by the enclave 110 on both the first and second blockchains 104A and 104B can be derived from a single master secret key. The master secret key can be securely kept within the enclave 110. The master secret key can be split into shares using secret sharing techniques and distributed to the plurality of wardens 112A-N. The secret shares can be transmitted through transport layer security (TLS) and/or remote attestation. On restart, the enclave 110 can, for example, fetch K of N shares of the master secret key from the wardens 112A-N to recompute the master secret key. The master secret key can then be used to rederive the private keys for the first blockchain 104A address, which can be used to hold assets or tokens, and private key(s) for the second blockchain 104B, which can be used to deploy smart contracts and mint new assets or tokens on the second blockchain 104B.

In general, the enclave 110 can track funds moving into the bridge wallet in the first blockchain 104A or being burned via smart contract at the second blockchain 104B. This information can be relayed from the wardens 112A-N to the enclave 110, and a K of N consensus between the wardens 112A-N can be required for the enclave 110 to take action. Similarly the wardens 112A-N can be responsible for tracking which transactions have already been processed by the enclave 110. The enclave 110 can use on-chain components for the first and/or second blockchains 104A and 104B. On the first blockchain 104A, for example, the enclave 110 can own a private key for a standard wallet on the first blockchain 104A (e.g., hereinafter the bridge wallet). This wallet can contain a mix of assets or tokens, including the tokens of the first blockchain 104A and tokens that have been moved across the bridge 114 to the second blockchain 104B. The enclave 110 can maintain a one to one relationship for all token funds held on the first blockchain 104A and minted tokens (excluding burned tokens) on the second blockchain 104B. The tokens of the first blockchain 104A can be used in some implementations to pay associated fees for moving tokens (e.g., token quantities) back from the second blockchain 104B.

As another example, on the second blockchain 104B, the enclave 110 can own a private key for a standard wallet on the second blockchain 104B. In addition, the enclave 110 can have a template token that can be used to mint each asset type that is migrated to the second blockchain 104B. The wallet on the second blockchain 104B can contain tokens used to pay transaction feeds for the minting transactions and additionally can be the only address allowed to mint tokens. When tokens are moved from the first blockchain 104A to the second blockchain 104B, a small portion of tokens can also be minted to the bridge operator's address as payment for fees. Similarly, when tokens are unwrapped (e.g., moved from the second blockchain 104B to the first blockchain 104A), a small portion of the tokens can be sent to an operator-controlled wallet of the first blockchain 104A (e.g., the bridge wallet).

Once the enclave 110 determines that an action is to be taken (e.g., minting or releasing tokens), the enclave 110 can generate and sign necessary transactions to process the action (e.g., request) on the opposite network. After generating the signed transactions, the enclave 110 can encrypt them using a key generated from the master secret key and send the encrypted transactions to each of the wardens 112A-N. Once K of the wardens 112A-N acknowledge the encrypted transactions, the enclave 110 can complete the action by sending each of the wardens 112A-N the unencrypted transactions for them to broadcast to the respective blockchain, depending on the transaction type. This two phase process can be beneficial to ensure that no single one of the wardens 112A-N can control which transactions the enclave 110 processes.

As an illustrative example, consider a scenario in which the encrypted transactions are not first sent to the wardens 112A-N and instead the signed transactions are sent directly, and the enclave 110 fails in sending the transactions to all but one of the wardens 112A-N, due to network failures, unexpected errors, or malicious behavior. In the event that the enclave 110 needs to be restarted, it may query the wardens 112A-N for incomplete transactions that the enclave 110 would have to reprocess. In this case, a threshold of the wardens 112A-N can truthfully say that the transaction had not been processed, but a single one of the wardens 112A-N that received the signed transaction could have broadcasted it to the respective blockchain yet reported to the enclave 110 that it did not broadcast the signed transaction. The single one of the wardens 112A-N can be malicious. In this case, the enclave 110 may double-process the request, which can lead to a double minting of tokens. Using the two-phase process disclosed herein, on the other hand, a threshold number of the wardens 112A-N must first acknowledge the encrypted transactions. Only the enclave 110 can decrypt the transactions. On any restart, the enclave 110 can ask each of the wardens 112A-N for any transactions in a "prepare" phase, and then decrypt and replay those transactions that the enclave 110 had already created. Even if only a single warden received the encrypted transactions, the enclave 110 can still verify that it generated the transactions contained within the encrypted transactions. If only a single warden receives the unencrypted signed transactions after a threshold of the wardens 112A-N acknowledged the encrypted transactions, on restart, the enclave 110 can resync the wardens 112A-N that did not receive the unencrypted transactions beforehand.

The enclave 110 described herein can be stateless. As a result, at any point a new bridge can be created or migrated to. So long as a consensus is reached amongst at least a majority of the wardens 112A-N, the new bridge and/or enclave can be established. The bridge can also be reconstructed using secret shares of a master private key of the enclave 110 that are held by the wardens 112A-N. Reconstructing the bridge can also include building a same bridge wallet 118 with a same quantity of tokens that were held in the prior version of the bridge wallet 118.

Figure 2:
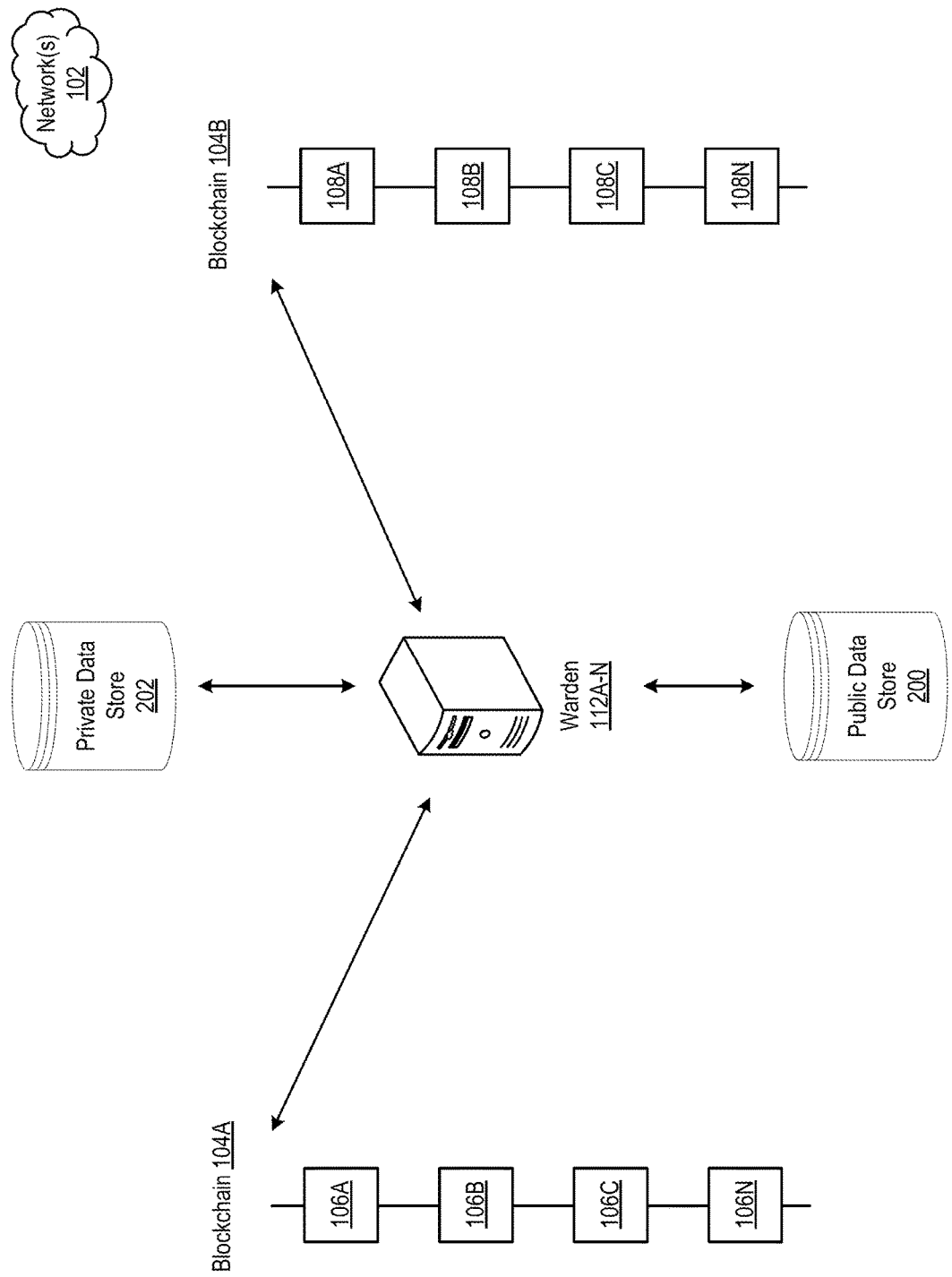
FIG. 2 is a conceptual diagram of wardens that perform some of the techniques described herein.

FIG. 2 is a conceptual diagram of wardens 112A-N that perform some of the techniques described herein. As described in reference to FIG. 1, the plurality of wardens 112A-N can be anonymous computer servers, systems, and/or networks of computing devices that communicate with each other and with the first and second blockchains 104A and 104B via the network(s) 102. The wardens 112A-N can be oracles or other out of the box blockchain clients.

The wardens 112A-N can also communicate with a private data store 202 and a public data store 200. In some implementations, for example, each of the wardens 112A-N can communicate with a different private data store 202 and all of the wardens 112A-N can communicate with the same public data store 200. In some implementations, each of the wardens 112A-N can communicate with different private and public data stores.

The wardens 112A-N can be trusted parties that have several responsibilities in the secure enclave environment described throughout this disclosure. The bridge can, for example, rely on the wardens 112A-N to both read and update a state of the first and second blockchains 104A and 104B that are supported by the secure enclave environment. The enclave can be configured to send all blockchain requests to multiple independent wardens 112A-N, and a quorum of these wardens 112A-N need to provide equivalent responses in order for the enclave to accept the response. This can ensure that no single warden can lie or otherwise act maliciously to trick the enclave. The more wardens 112A-N and the higher number of wardens 112A-N that is required for a quorum, the more distributed and secure the bridge can be.

As mentioned in reference to FIG. 1, each of the wardens 112A-N can receive a single secret share of a master secret key from the enclave when the enclave first initializes. A configurable threshold of these shares can be sufficient to regenerate the enclave's master secret key. If the enclave ever restarts, the enclave can query the wardens 112A-N to get the secret shares and recompute the enclave's master secret key value. All other secret values used by the enclave can be deterministically derived from the master secret key.

The wardens 112A-N can also continuously monitor or otherwise index the first and second blockchains 104A and 104B. The enclave can query the wardens 112A-N for transactions sent to a specific address on each of the first and second blockchains 104A and 104B. The wardens 112A-N can build an index of transactions in data stores such as the private data store 202. To build the index, the wardens 112A-N can query the nodes 106A-N and 108A-N of the first and second blockchains 104A and 104B for each block and iterate through the transactions.

The wardens 112A-N can also track which bridge requests have been processed by the enclave. More specifically, the wardens can track wrapping and unwrapping transactions. Upon receiving a wrapping transaction, the bridge's trusted codebase can generate and send a mint transaction on the second blockchain 104B, as described herein. Similarly, the bridge can generate and send a release/transfer transaction on the first blockchain 104A when it receives an unwrapping transaction. In order to send these transactions to their respective networks, the enclave must relay the transactions first to the wardens 112A-N, where the transactions can be broadcasted to the nodes 106A-N and 108A-N of the first and second blockchains 104A and 104B. Once broadcasted, the wardens 112A-N can mark the transactions as processed in the private data store 202.

Moreover, the wardens 112A-N can track wrapped token pairings. The bridge described herein can create a wrapped token contract on the second blockchain 104B for each token of the first blockchain 104A that the bridge supports. If restarted, the bridge can list additional tokens that it supports and create new wrapped token contracts. The bridge may not de-list a token that it previously supported. To ensure that the bridge does not de-list supported tokens, all supported tokens and their corresponding wrapped token contract address can be stored with the wardens 112A-N (e.g., at the private data store 202), and fetched by the enclave at startup.

In some implementations, the wardens 112A-N can also maintain what users or entities are allowed to mint assets on the second blockchain 104B. The bridge can be built so that the wardens 112A-N can remove and add an ability to mint assets through the second blockchain 104B's smart contracts. If a new bridge comes online or an existing bridge needs to migrate to a new address, the wardens 112A-N can explicitly give permissions to do so.

The wardens 112A-N may also host public information. Information such as fees, minimum transfer requirements, and which tokens are supported can be configured and maintained in the enclave. As the enclave is not publicly accessible, the wardens 112A-N can have a responsibility of publicly hosting that information. In addition, the wardens can be responsible for hosting an attestation report for public consumption. This information can be stored in the public data store 200 and retrieved when reported out to the public by the wardens 112A-N.

In some implementations, the wardens 112A-N can be changed. To change membership of the wardens 112A-N for the particular secure enclave environment, code that is run by the enclave can be modified to include an identifier (e.g., domain) of each warden that will act in the secure enclave environment. The existing wardens 112A-N may be required to agree to the change in membership before the wardens 112A-N are updated. Standard TLS techniques can be used to ensure that correct and secure communication is established between the wardens 112A-N, the enclave, and the bridge described herein.

Moreover, in some implementations, information about the wardens 112A-N can be public. This information can include identifiers or domains that otherwise identify the wardens 112A-N that preside over the secure enclave environment. Making such information public can be beneficial to help the wardens 112A-N trust each other and also to help the users trust the secure enclave environment. In yet some implementations, any one or more of the wardens 112A-N can also be operators of the enclave or other enclaves in other secure enclave environments.

Figure 3B:
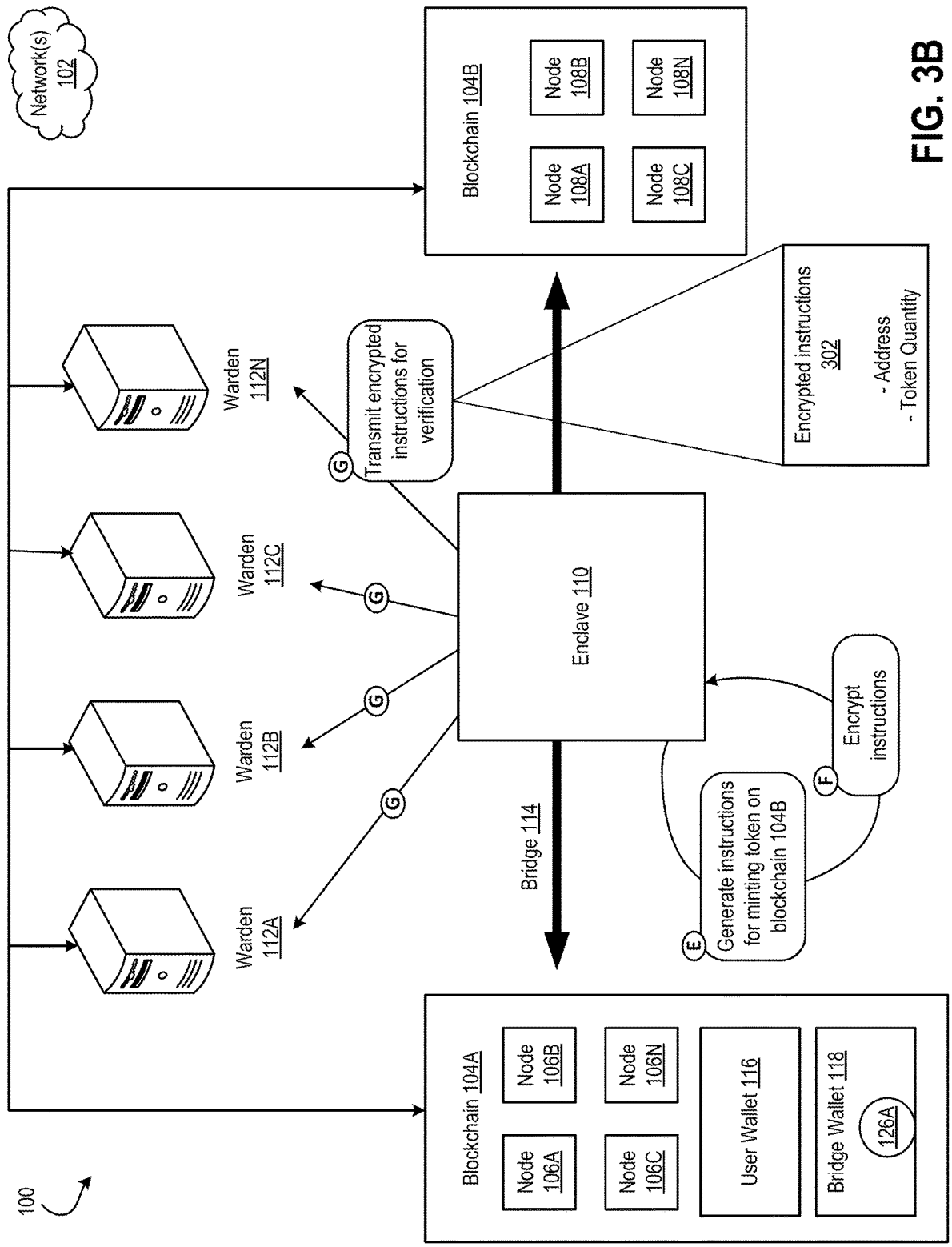

FIGS. 3A-D are conceptual diagrams of a process for minting tokens on a blockchain using the techniques described herein. Referring to FIG. 3A and as described in reference to FIG. 1, a user can initiate transferring of token 126A from the user's wallet 116 to a bridge wallet 118 on the first blockchain 104A (step A). The token 126A can be a token, cryptocurrency, or other digital asset of the first blockchain 104A. Transferring the token 126A can include transferring a quantity of the token 126A into the bridge wallet 118. When the token 126A is transferred into the bridge wallet 118, the user is beginning a transaction to transfer their token 126A from the first blockchain 104A for use on the second blockchain 104B. In other words, the user is beginning a transaction to mint a token on the second blockchain 104B.

The user wallet 116 can have an address that can also be used for a corresponding wallet on the second blockchain 104B. Thus, the token 126A quantity can be transferred from the user wallet 116 on the first blockchain 104A to the user wallet on the second blockchain 104B using the same address. This can be advantageous to reduce a possibility that the token 126A quantity is transferred to the wrong wallet on the second blockchain 104B, thereby increasing security and trust of the secure enclave environment 100.

The bridge wallet 118 can have a private key that is held by the enclave 110. The bridge wallet 118 can be operated by the enclave 110 and can store or otherwise lock tokens such as the token 126A that are transferred in from user wallets on the first blockchain 104A. The bridge wallet 118 can retain the tokens such as the token 126A therein until, for example, a burn request/transaction is received at the second blockchain 104B (e.g., refer to FIGS. 4A-D). So long as the token 126A is held in the bridge wallet 118, the token 126A cannot be replicated or otherwise used by the user. Moreover, the first blockchain 104A can maintain user wallets for all of the users having assets, tokens, and/or transactions on the first blockchain 104A. The nodes 106A-N of the first blockchain 104A can perform operations such as transferring the token 126A from the user wallet 116 to the bridge wallet 118.

Still referring to FIG. 3A, the wardens 112A-N can poll the first blockchain 104A for updates to the bridge wallet 118 (step B). Polling the first blockchain 104A can include communicating with one or more of the nodes 106A-N to determine whether a state of the bridge wallet 118 has been modified or otherwise changed. For example, the wardens 112A-N can poll the nodes 106A-N to determine whether users transferred tokens from the users' wallets to the bridge wallet 118. As mentioned above, when users transfer tokens from the users' wallets to the bridge wallet 118, the users are beginning a process to transfer tokens to the second blockchain 104B.

One or more of the wardens 112A-N can poll the first blockchain 104A at predetermined times, such as every couple seconds, minutes, and/or hours. For example, the wardens 112A-N can poll the first blockchain 104A every 5 seconds. In some implementations, the enclave 110 can poll the wardens 112A-N to then poll the first blockchain 104A.

In some implementations, a first subset of the wardens 112A-N can poll the first blockchain 104A and one or more other subsets of the wardens 112A-N may or may not poll the first blockchain 104A. For example, the first subset of the wardens 112A-N can poll the first blockchain 104A at a first time and a second subset of the wardens 112A-N can poll the first blockchain 104A at a second time that is different than the first time (e.g., after the first time, before the first time).

One or more of the wardens 112A-N can identify updates to the bridge wallet 118 (step C). In the example of FIG. 3A, the wardens 112A, 112B, and 112N identify (e.g., verify) that a transfer of the token 126A from the user wallet 116 to the bridge wallet 118 occurred on the first blockchain 104A. The wardens 112A, 112B, and 112N can notify the enclave 110 of this token transfer. Thus, the wardens 112A-N can look out for on-chain deposits of tokens from one user wallet to the bridge wallet 118. Sometimes, all of the wardens 112A-N can identify that the token transfer occurred on the first blockchain 104A. As depicted in FIG. 3A, in some implementations, fewer than all of the wardens 112A-N may identify that the token transfer occurred.

Once the enclave 110 receives notification from one or more of the wardens 112A-N about the token transfer, the enclave 110 can determine whether a consensus was reached for the token transfer (step D). The consensus can be a minimum quantity of the wardens 112A-N that is needed to verify that the transaction occurred to be able to proceed with transferring the token 126A quantity from the first blockchain 104A to the second blockchain 104B. Determining whether the consensus is reached amongst the wardens 112A-N can be beneficial to ensure that no single warden lies about a state of the bridge wallet 118 and/or maliciously tries to control the enclave 110 and minting process of tokens. Therefore, consensus amongst the wardens 112A-N can allow for the enclave 110 to trust the wardens 112A-N, thereby creating a secure environment for transferring tokens across blockchains.

In some implementations, the consensus can be 50% or more of the wardens 112A-N. In some implementations, the consensus can be any value that is more than a majority of the wardens 112A-N, including but not limited to 55%, 60%, 70%, 80%, 90%, 95%, etc.

In the example of FIG. 3A, the consensus can be 50%. Therefore, in step D, the enclave 110 can determine whether 50% or more of the wardens 112A-N identified the transfer of the token 126A from the user wallet 116 to the bridge wallet 118. Here, since 3 of the 4 wardens 112A-N identified the token transfer, the 50% consensus has been satisfied. The process can therefore proceed with FIG. 3B.

As shown in FIG. 3B, since the consensus has been reached (e.g., refer to step D in FIG. 3A), the enclave 110 can generate instructions for minting a token on the second blockchain 104B (step E). The instructions can identify an address associated with the user wallet 116 that initiated the transaction into the bridge wallet 118. The instructions can also identify a quantity of tokens that would need to be quantified or otherwise minted on the second blockchain 104B. As described above in reference to FIG. 1, the same address associated with the user wallet 116 can be used to identify which wallet at the second blockchain 104B to mint the tokens to. Using the same address can be advantageous to reduce the possibility that tokens will be minted to the wrong wallet on the second blockchain 104B.

Once the instructions for minting are generated, the enclave 110 can encrypt the instructions (step F). Encrypting the instructions can be beneficial to ensure that the user's privacy is maintained and that the transaction is secure as it is transferred out of the enclave 110 and to the wardens 112A-N. This can also be beneficial in the event that the enclave 110 goes down and has to be booted back up. Encryption can protect the transaction from activity of a malicious node or other malicious user operating outside of the enclave 110. The encrypted instructions 302 can include the address of the requesting user's wallet on the second blockchain 104B and the quantity of the token 126A to be minted on the second blockchain 104B.

The enclave 110 can transmit the encrypted instructions to the wardens 112A-N for verification (step G). Performing this step can be advantageous to ensure that none of the wardens 112A-N act on their own to control the minting process. Moreover, encrypting the instructions can be beneficial so that in the event that the enclave 110 goes down and is rebooted, the encrypted instructions can be requested by the enclave 110 from the wardens 112A-N, decrypted, then used to complete the minting transaction.

Referring to FIG. 3C, one or more of the wardens 112A-N can verify that they received the encrypted instructions (step H). The enclave 110 can desire acknowledgement of receipt from a majority of the wardens 112A-N before transmitting the actual instructions for minting to the wardens 112A-N. The one or more wardens 112A-N can transmit this verification back to the enclave 110. The enclave 110 can then determine whether K of the wardens 112A-N verified receipt of the encryption instructions (step I). K of the wardens can be any quantity of the wardens 112A-N, such as 50% or some quantity that is equal to or greater than a majority of the wardens 112A-N (e.g., refer to the consensus described in reference to step D in FIG. 3A). In the example of FIG. 3C, K can be equal to at least half of the wardens 112A-N. Here, all of the wardens 112A-N verified receipt of the encrypted instructions in step H. Thus, in step I, the enclave 110 can determine that at least K of the wardens verified receipt.

Since the K threshold has been satisfied, the enclave 110 can now decrypt the instructions (step J). In other words, there is a secure connection between the enclave 110 and the wardens 112A-N. The wardens 112A-N can be trusted, together, to broadcast instructions for minting the tokens on the second blockchain 104B.

The decrypted instructions can accordingly be transmitted to the wardens 112A-N (step K). The enclave 110 may hold onto the decryption key because the enclave 110 can use the same decryption key for all transactions. Thus, the enclave 110 may send the fully decrypted instructions to the wardens 112A-N in step K.

Figure 3D:
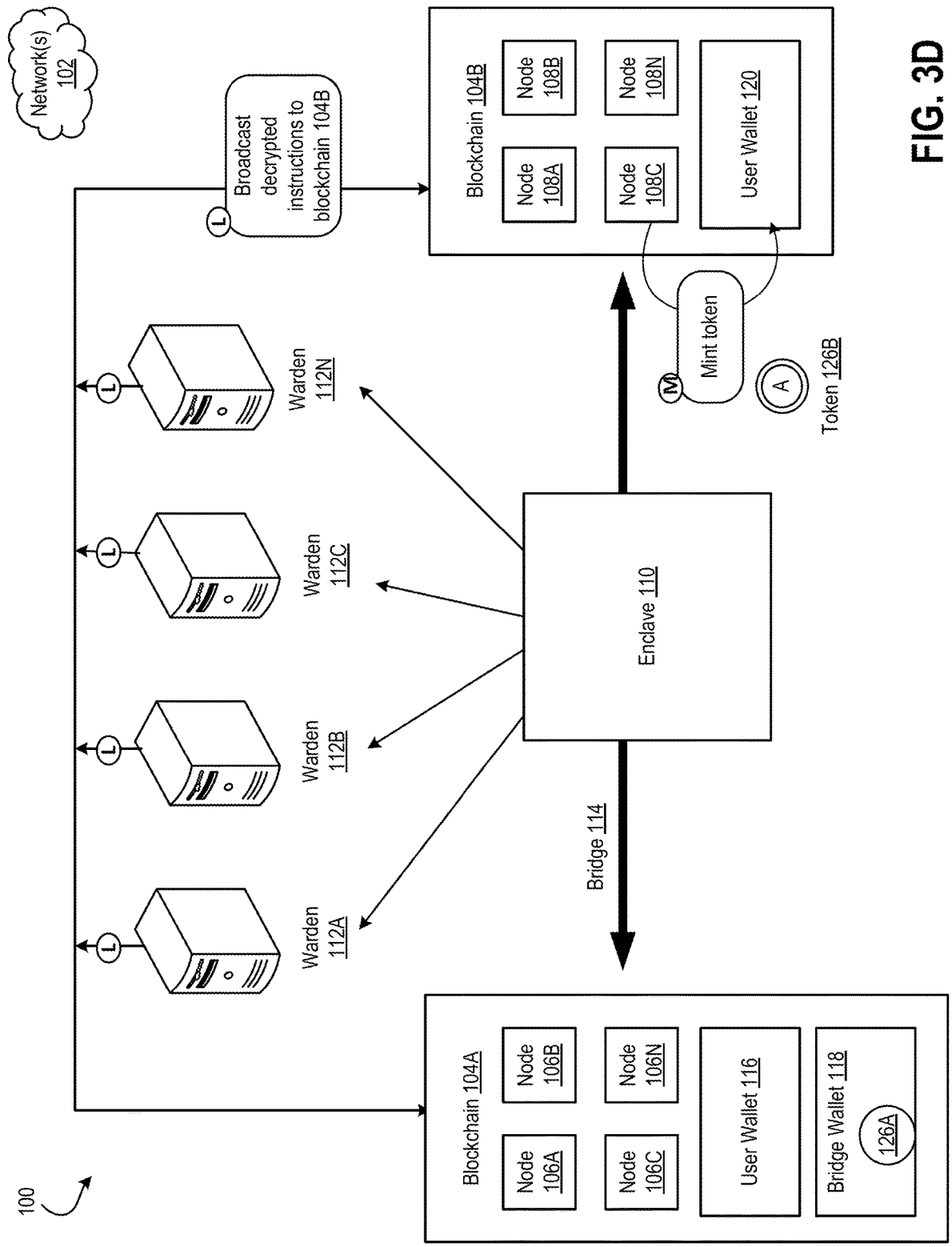

Referring to FIG. 3D, once the wardens 112A-N receive the decrypted minting instructions, the wardens 112A-N can broadcast the decrypted instructions to the second blockchain 104B. More specifically, the wardens 112A-N can broadcast the instructions to one or more of the nodes 108A-N.

One or more of the nodes 108A-N can mint token 126B, which can include putting the minted token 126B into user wallet 120 (step M). As mentioned above, the user wallet 120 can be identified using the same address as that which is used for the user wallet 116. The address can be identified in the decrypted instructions 302. In some implementations, where the address of the user wallet 120 is different than the address of the user wallet 116, the address of the user wallet 120 can be included in a memo field of the transfer transaction that was made on the first blockchain 104A from the user wallet 116 to the bridge wallet 118. The nodes 108A-N can then use the address in the memo field to mint the token 126B to the user wallet 120. When the destination address is in the memo field or in another portion of the transaction, the wardens 112A-N can be polled to verify that the destination address in the memo field matches the address of the user wallet 120. This process can be used to ensure that the token 126B is not minted to a wrong wallet.

Minting the token 126B can include wrapping the token 126A. In other words, the actual token 126A is not transferred from the first blockchain 104A to the second blockchain 104B. Instead, the token 126B is a wrapped token 126A that acts as an IOU and indicates how much value the user would have on the first blockchain 104 as the token 126A. Therefore, minting the token 126B can include generating the token 126B to correspond to the quantity of the token 126A that is identified in the decrypted instructions 302. The user can then use the minted token 126B in an exchange of the second blockchain 104B.

Figure 4C:
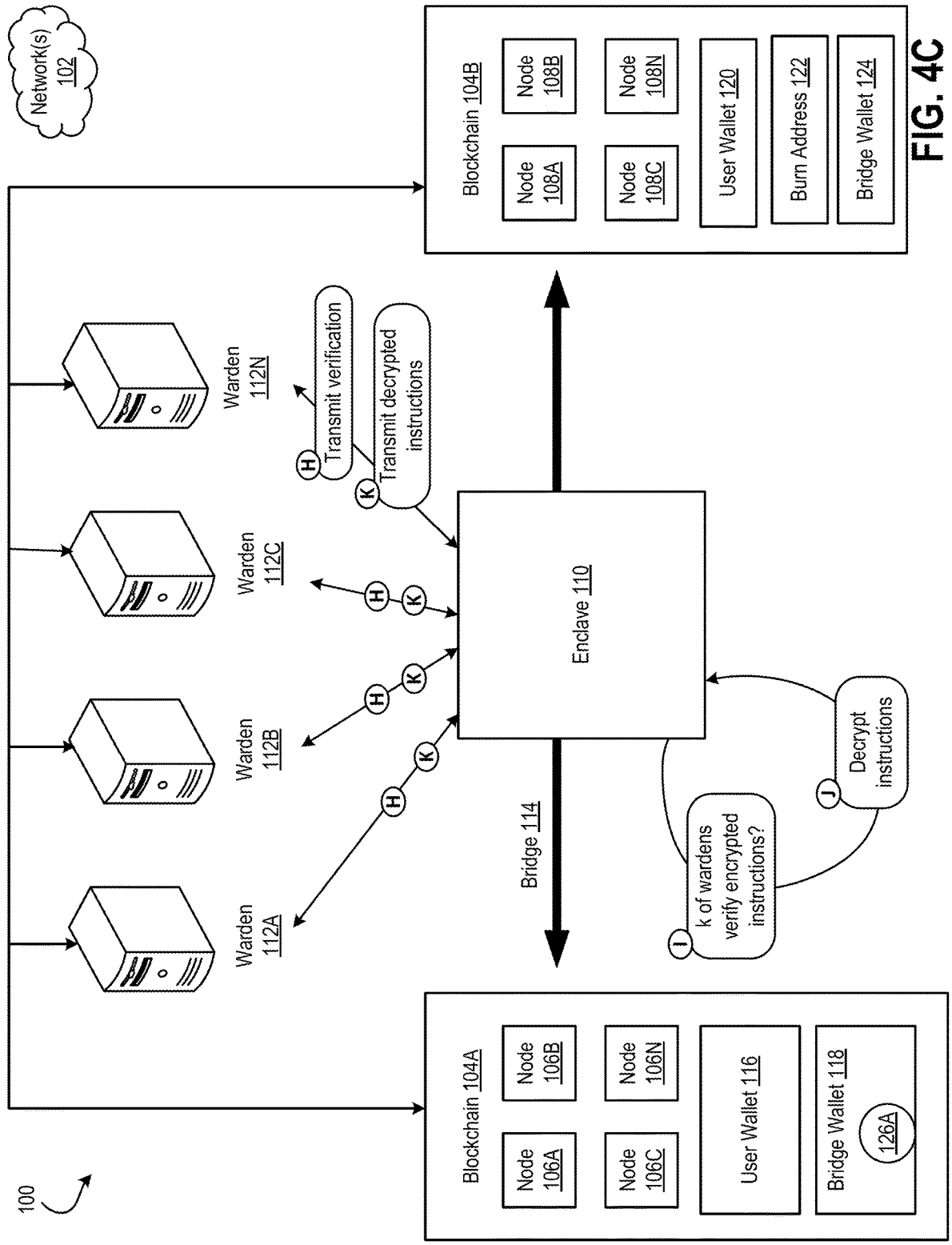

FIGS. 4A-D are conceptual diagrams of a process for releasing tokens on a blockchain using the techniques described herein. Releasing tokens can include burning the tokens on a blockchain. Referring to FIG. 4A, a user, such as the user described in reference to FIGS. 3A-D can transfer token 126B from user wallet 120 to a burn address 122 and/or a bridge wallet 124 on the second blockchain 104B (step A). The same user from the FIGS. 3A-D may not be involved in the releasing process described in FIGS. 4A-D. Instead, any other user that is transacting cross chains can be assigned the user wallet 120 and transfer their token 126B to the burn address 122 and/or the bridge wallet 124.

The user can invoke or start a smart contract (e.g., transaction) to burn their token 126B on the second blockchain 104B. The nodes 108A-N can then release the token 126B from the user wallet 120. As described in reference to FIGS. 3A-D, the token 126B can be a minted token of a quantity of the token 126A that the user moved into the bridge wallet 118 on the first blockchain 104A. Thus, the token 126B can wrap the token 126A.

The user wallet 120 on the second blockchain 104B can have the same address and private key as the user wallet 116 on the first blockchain 104A. Therefore, the same user can access the user wallet 120 and the user wallet 116. As described above, using the same address can be advantageous to ensure security of transactions such as minting and burning tokens. In some implementations, the user wallet 120 and the user wallet 116 can have different addresses, as described above.

The burn address 122 can be a public address of the second blockchain 104B. Users can send assets, such as tokens and other cryptocurrencies, to the burn address 122. Once sent to the burn address 122, the assets can never be recovered since there are no private keys for the burn address 122. The assets sent to the burn address 122 are essentially burnt and can never be used again. Therefore, when the user sends the token 126B from the user wallet 120 to the burn address 122, the user is removing the token 126B from their wallet 120 and will never be able to access or use that token 126B again.

As shown in FIGS. 4A-D, the enclave 110 can operate and maintain the bridge wallet 124 on the second blockchain 104B as well as the bridge wallet 118 on the first blockchain 104A. Assets, such as the token 126A, can be held in the bridge wallet 118 on the first blockchain 104A until such token quantity is used up and/or released back to the user of the user wallet 116. Assets, such as the token 126B, can be put into the bridge wallet 124 on the second blockchain 104A such that those assets can be burned and no longer usable or recoverable by the user. In some implementations, assets can be held in the bridge wallet 124 for a predetermined period of time, then the assets can be burned in one or more batches. In some implementations, assets that are transferred to the bridge wallet 124 can be burned upon arrival in the bridge wallet 124.

Still referring to FIG. 4A, one or more of the wardens 112A-N can poll the second blockchain 104B for any updates to the burn address 122 and/or the bridge wallet 124 (step B). As described in reference to step B in FIG. 3A, the wardens 112A-N can poll the nodes 108A-N for state changes of the second blockchain 104B at predetermined times, such as every 5 seconds. The enclave 110 can also request the wardens 112A-N to poll the nodes 108A-N of the second blockchain 104B at predetermined times. The wardens 112A-N can poll the second blockchain 104B in order to determine whether smart contracts (e.g., transactions) were executed by the nodes 108A-N that involved the transfer of the token 126B (or other tokens) from the user wallet 120 (or other wallets) to the burn address 122 and/or the bridge wallet 124. Therefore, the wardens 112A-N can become aware of any changes to the state of the second blockchain 104B that suggest a burn request occurred.

One or more of the wardens 112A-N can identify that the transfer of the token 126B occurred on the second blockchain 104B (step C). As described in reference to step C in FIG. 3A, the wardens 112A-N can verify that the smart contract (e.g., transaction) involving the burning of the token 126B was created and executed. Moreover, as described above, in some implementations, less than all of the wardens 112A-N may identify the token transfer. In some implementations, all of the wardens 112A-N may identify the token transfer. Here, wardens 112A, 112B, and 112N identify that the token transfer occurred. The wardens 112A, 112B, and 112N can transfer their identification of the token transfer to the enclave 110.

The enclave can then determine whether consensus was reached for the corresponding token 126A to be released from the bridge wallet 118 on the first blockchain 104A (step D). As described in reference to step D in FIG. 3A, the consensus can be a predetermined quantity of the wardens 112A-N that must provide identification of the token transfer for a token release action to occur. For example, the consensus can be at least a majority of the wardens 112A-N. In some implementations, the consensus can be at least a majority of the wardens 112A-N that poll the second blockchain 104B for updates in step B. In some implementations, the consensus can be at least a majority of the wardens 112A-N that preside over the secure enclave environment 100. Moreover, in some implementations, the consensus can be any numeric value, quantity, or percentage of the wardens 112A-N, including but not limited to 55%, 60%, 65%, 70%, 75%, 80%, 85%, 90%, 95%, etc.

In the example of FIG. 4A, the enclave 110 can determine that the consensus has been reached to release the token 126A from the bridge wallet 118 on the first blockchain 104A. Here, 3 of the 4 wardens 112A-N identified the token transfer on the second blockchain 104B, which is more than 50% or the majority of the wardens 112A-N that operate with the secure enclave environment 100. Thus, the enclave 110 can determine that enough of the wardens 112A-N verified the smart contract (e.g., transaction) to transfer the token 126B from the user wallet 120 to the burn address 122 and/or the bridge wallet 124.

As shown in FIG. 4B, the enclave 110 can generate instructions for releasing the corresponding token 126A in the bridge wallet 118 on the first blockchain 104A (step E). As described in reference to step E in FIG. 3B, the instructions can include the address of the user wallet 116, where the token 126A should be released to on the first blockchain 104A. The instructions can also include the quantity of the token 126A that should be released from the bridge wallet 118 on the first blockchain 104A. As described throughout, the address for the user wallet 116 can be the same as the address for the user wallet 120. In some implementations, the addresses may be different. When the addresses are different, the smart contract that was executed in step A to transfer the token 126B on the second blockchain 104B can indicate, such as in a memo field, the address of the user wallet 116. The enclave 110 can verify the address in the memo field by polling the wardens 112A-N to identify a match of the address with the user wallet 116 on the first blockchain 104A. Once the wardens 112A-N (e.g., at least a majority of the wardens 112A-N) verify the address, the enclave 110 can include the address in the instructions that are generated in step E.

The enclave 110 can then encrypt the instructions (step F). Encrypting the instructions can be advantageous in the event that the enclave 110 goes down and needs to be rebooted, as described in reference to FIGS. 3B and 7-10. Encrypted instructions 402 can include the address for the user wallet 116 and the quantity of the token 126A to be released from the bridge wallet 118.

The enclave 110 can transmit the encrypted instructions 402 to the wardens 112A-N for verification (step G). As described in reference to FIGS. 3B and 7-10, transmitting the encrypted instructions to the wardens 112A-N can be advantageous to ensure that no one warden 112A-N maliciously controls releasing the token 126A on the first blockchain 104A.

As shown in FIG. 4C, one or more of the wardens 112A-N can verify that they received the encrypted instructions. Accordingly, those wardens 112A-N can transmit verification back to the enclave 110 (step H).

Once the enclave 110 receives verification from one or more of the wardens 112A-N, the enclave 110 can determine whether K of the wardens 112A-N verified the encrypted instructions (step I). As described in reference to step I in FIG. 3C, K can be any quantity of the wardens 112A-N that is equal to or greater than a majority of the wardens 112A-N (e.g., 50%, 55%, 60%, 65%, 70%, 75%, 80%, 85%, 90%, 95%, etc.).

In FIG. 4C, all of the wardens 112A-N verified receipt of the encrypted instructions. Thus, the enclave 110 can determine that K of the wardens 112A-N verified the encrypted instructions in step I (100% of the wardens 112A-N in this example). Since K of the wardens 112A-N verified, the enclave 110 can now decrypt the instructions (step J). The enclave 110 has established a secure connection and trust with the wardens 112A-N. Thus, the enclave 110 can provide the wardens 112A-N with the instructions needed to execute the release of the token 126A on the first blockchain 104A.

The enclave 110 may decrypt the instructions and transmit the decrypted instructions (step K) to the wardens 112A-N because the enclave 110 retains the private key used for decryption. The enclave 110 can use the same private key for decrypting all release transactions in FIG. 4C. Moreover, as described further in reference to FIGS. 7-10, the private decryption key can be created from the master secret key of the enclave 110. The decryption key can be known only to the enclave 110 and used only by the enclave 110. The decryption key may not be transmitted to the wardens 112A-N with the encrypted instructions 402 so that the wardens 112A-N can decrypt the instructions. Maintaining the decryption key at the enclave 110 can be advantageous to ensure that none of the wardens 112A-N can act independently of each other and/or maliciously with regards to the release transaction. Security and trust can be maintained between the enclave 110, the wardens 112A-N, and the user(s) involved in the release transaction.

Figure 4D:
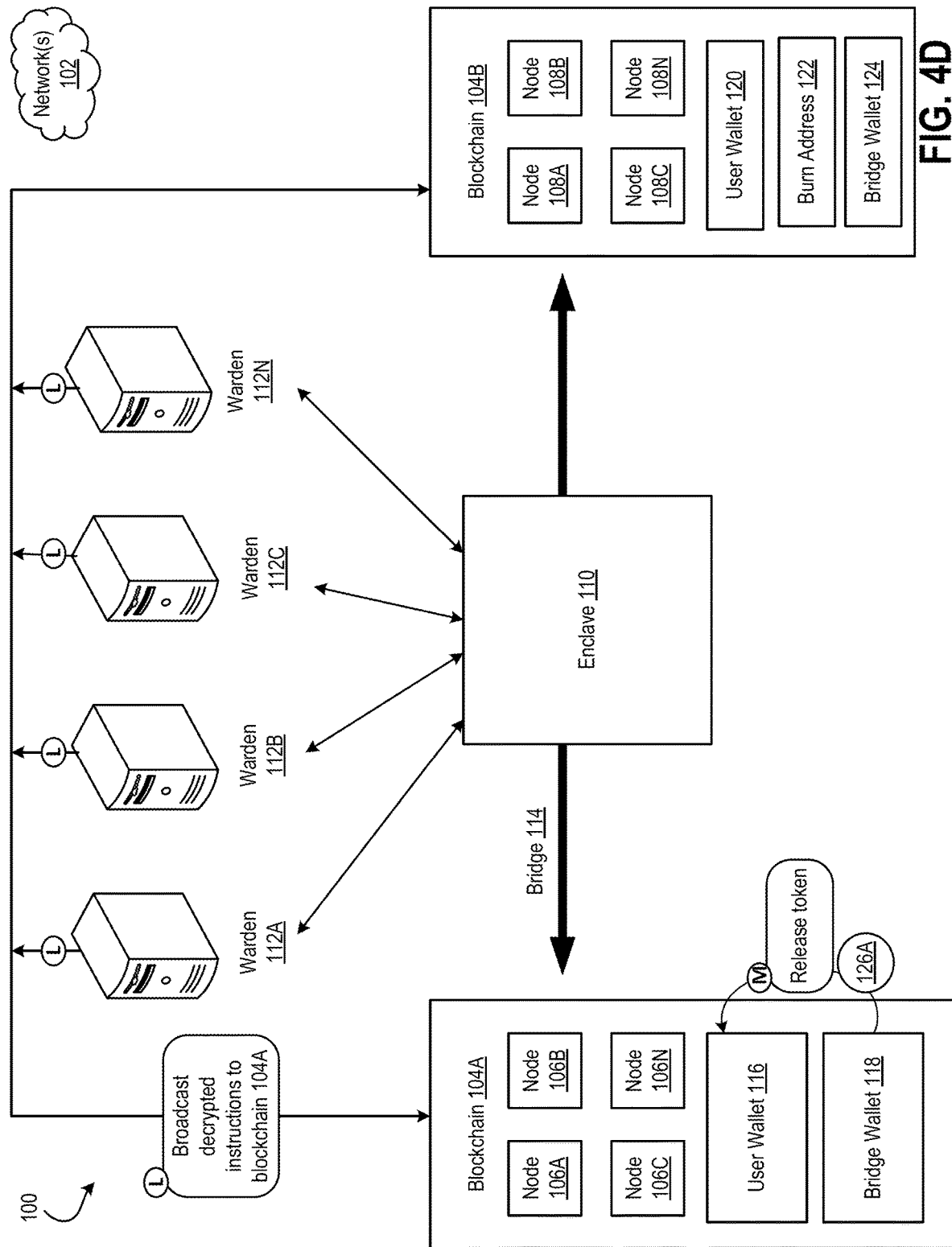

In FIG. 4D, once the wardens 112A-N receive the decrypted instructions, the wardens 112A-N can broadcast the decrypted instructions to the first blockchain 104A (step L). In other words, the decrypted instructions can be broadcasted to the nodes 106A-N of the first blockchain 104A. One or more of the nodes 106A-N can execute the release transaction using the instructions. For example, one or more of the nodes 106A-N can release the token 126A from the bridge wallet 118 (step M). Releasing the token 126A can include returning the quantity of the token 126A that is indicated in the decrypted instructions back to the user wallet 116. As described herein, the nodes 106A-N can identify the user wallet 116 using the address included in the decrypted instructions. Once the token 126A is released from the bridge wallet 118, the token 126A is no longer frozen. The user of the user wallet 116 can use the token 126A in transactions, smart contracts, on an exchange, etc. on the first blockchain 104A. The user can also, for example, transfer a quantity of the token 126A across the bridge 114 to one or more other blockchains or networks, including but not limited to the second blockchain 104B.

Figure 5:
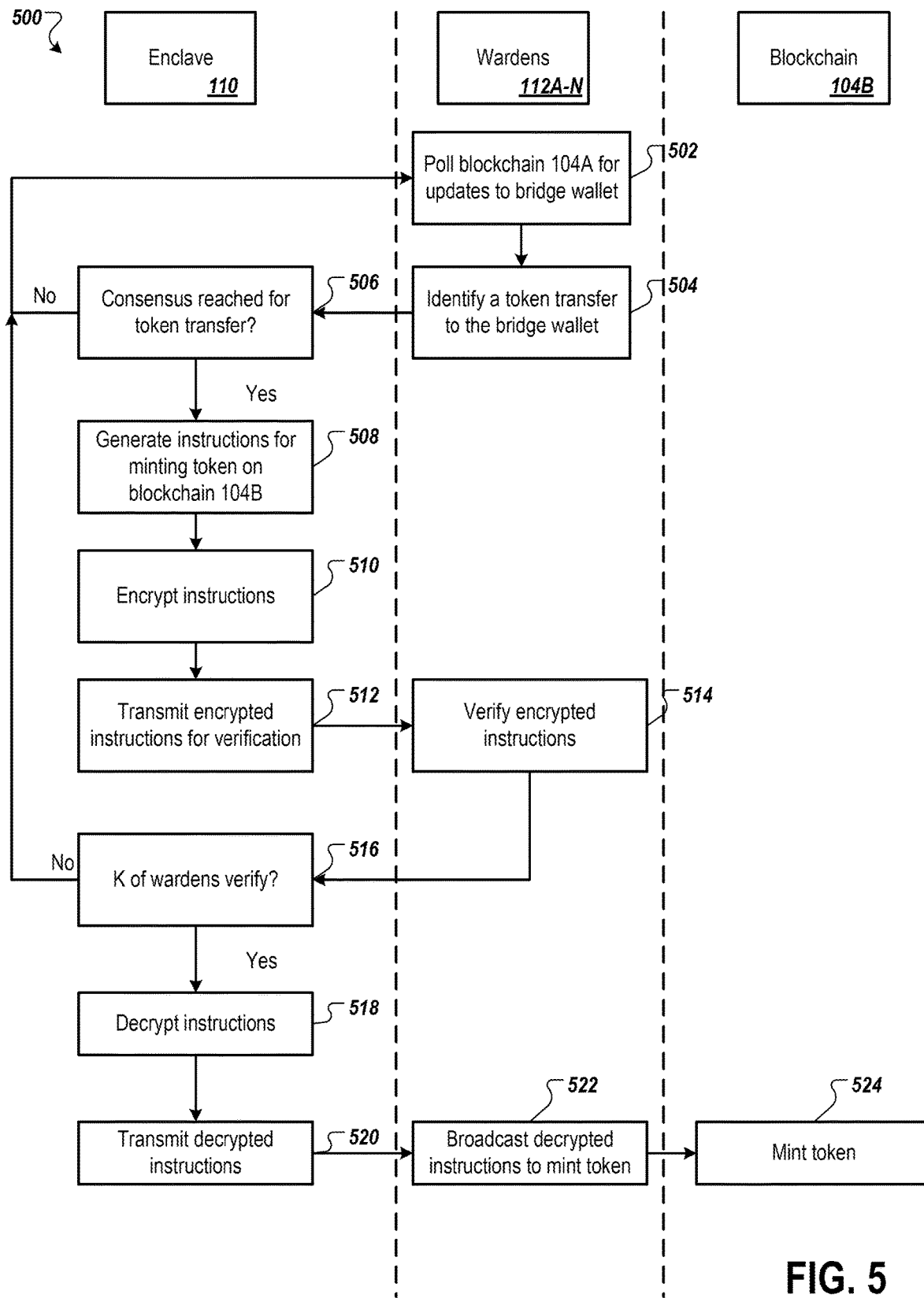
FIG. 5 is a swimlane diagram of a process for minting tokens.

FIG. 5 is a swimlane diagram of a process 500 for minting tokens. The process 500 is similar to the process for minting tokens described in reference to FIGS. 3A-D. Minting can occur when a user on one blockchain requests to transfer a quantity of tokens from that blockchain to another blockchain. The request to transfer the quantity of tokens can be in the form of a smart contract.

One or more blocks in the process 500 can be performed by the enclave 110, the wardens 112A-N, and the second blockchain 104B. One or more blocks in the process 500 can also be performed by other actors, servers, and/or computing environments.

Referring to the process 500, the wardens 112A-N can poll a first blockchain, such as the blockchain 104A described in reference to FIGS. 1-4, for updates to the bridge wallet on the first blockchain (502). Refer to step B in FIG. 3A. The updates to the bridge wallet can include a transfer of a token quantity from a user's wallet to the bridge wallet. This transfer can be initiated by the user via a smart contract and executed by one or more nodes that operate the first blockchain 104A.

One or more of the wardens 112A-N can identify that a token transfer was made to the bridge wallet in 504. Refer to step C in FIG. 3A. The wardens 112A-N, for example, can verify that the token quantity was in fact transferred from the user wallet to the bridge wallet on the first blockchain 104A.

The enclave 110 can then determine whether consensus was reached amongst the wardens 112A-N for the token transfer in 506. Refer to step D in FIG. 3A. If consensus was not reached amongst the wardens 112A-N, then the process 500 can return to block 502 and the wardens 112A-N can continuously poll the first blockchain 104A for any updates made to the bridge wallet. Consensus may not be reached when not enough of the wardens 112A-N poll the first blockchain 104A for updates. Consensus may also not be reached when enough of the wardens 112A-N poll the first blockchain 104A for updates but less than a majority of the wardens 112A-N verify that the token transfer occurred.

If consensus was reached amongst the wardens 112A-N, the enclave 110 can generate instructions for minting a token on the second blockchain 104B in 508. Refer to step E in FIG. 3B. The instructions can indicate an address of the user's wallet on the second blockchain 104B where the token can be minted to. The instructions can also indicate a quantity of the token to be minted on the second blockchain 104B. The quantity can correspond to the quantity of the token that was transferred from the user wallet to the bridge wallet on the first blockchain 104A.

The enclave 110 can encrypt the instructions in 510. Refer to step F in FIG. 3B.

The enclave 110 can then transmit the encrypted instructions to the wardens 112A-N for verification in 512. Refer to step G in FIG. 3B.

The wardens 112A-N can verify the encrypted instructions in 514. Refer to step H in FIG. 3C. For example, the wardens 112A-N can verify that they received the encrypted instructions.

The enclave 110 can determine whether K of the wardens 112A-N verify receipt of the encrypted instructions in 516. Refer to step I in FIG. 3C. As described throughout, K can be a majority of the wardens 112A-N or any quantity of the wardens 112A-N that is greater than a majority of the wardens 112A-N.

If K of the wardens 112A-N do not verify receipt of the encrypted instructions in 516, then the process 500 can return to block 502. As described above in reference to block 506, K of the wardens 112A-N may not verify receipt if, for example, not all of the wardens 112A-N received the encrypted instructions. K of the wardens 112A-N may not verify receipt if all of the wardens 112A-N received the encrypted instructions but less than a majority of the wardens 112A-N responded to the enclave 110 within a predetermined period of time. For example, the wardens 112A-N may have a threshold time period in which to verify receipt of the instructions before the verification request from the enclave 110 expires.

If K of the wardens 112A-N do verify receipt of the encrypted instructions in 516, then the enclave 110 can decrypt the instructions in 518. Refer to step J in FIG. 3C.

The enclave 110 can then transmit the decrypted instructions to the wardens 112A-N in 520. Refer to step K in FIG. 3C.

The wardens 112A-N can broadcast the decrypted instructions to mint the token on the second blockchain 104B in 522. Refer to step L in FIG. 3D. The instructions can be broadcasted to one or more nodes that operate the second blockchain 104B.

The second blockchain 104B can then mint the token using the decrypted instructions in step 524. Refer to step M in FIG. 3D. As described above, the token can be minted by one or more of the nodes that operate the second blockchain 104B.

Figure 6:
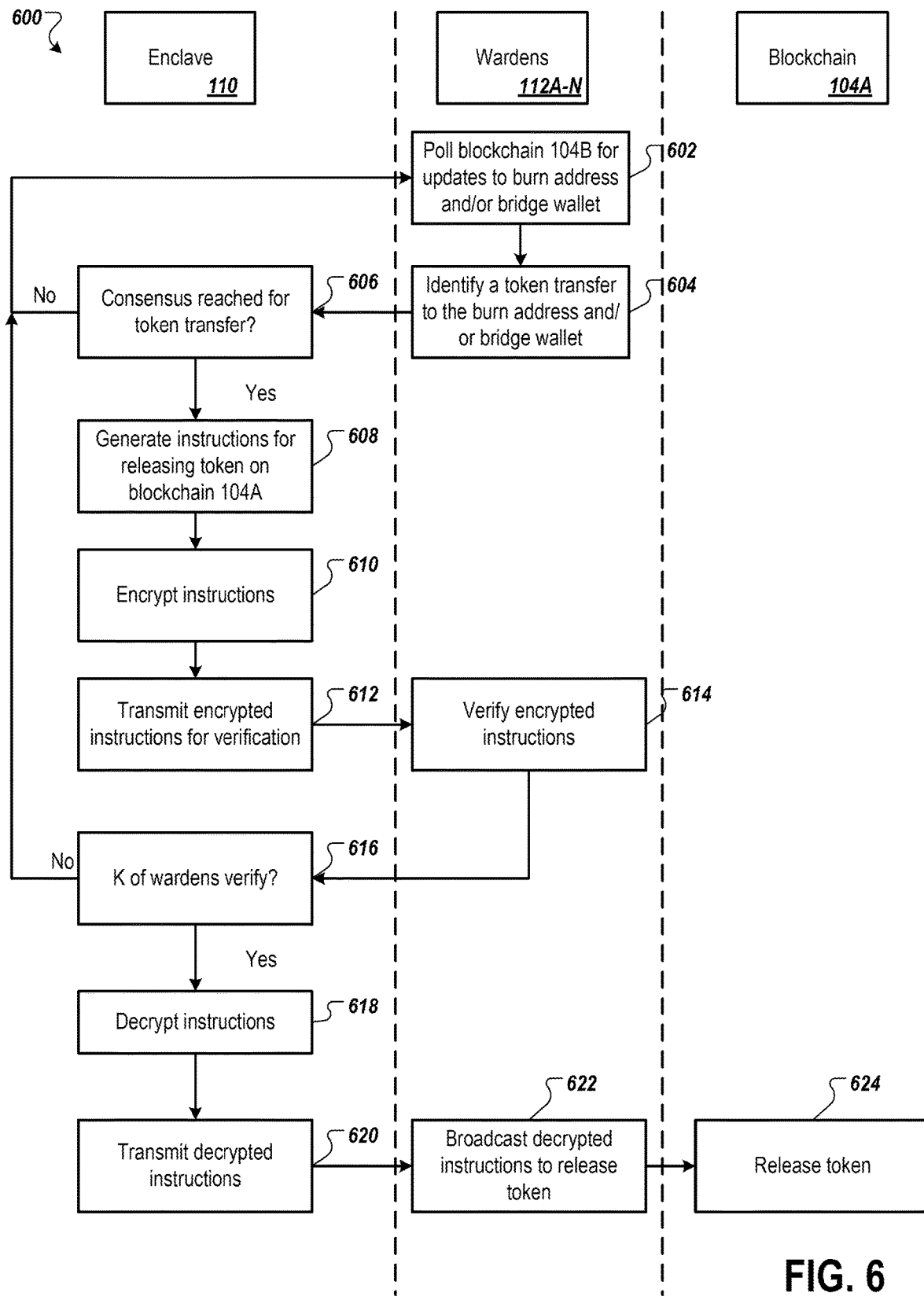
FIG. 6 is a swimlane diagram of a process for releasing tokens.

FIG. 6 is a swimlane diagram of a process 600 for releasing tokens. The process 600 is similar to the process for releasing tokens described in reference to FIGS. 4A-D.

Releasing tokens can occur when a user on one blockchain requests to or otherwise burns a quantity of tokens on that blockchain. Burning the tokens affects the user's corresponding wallet on another blockchain. After all, the quantity of the token on the one blockchain that is burned can be released from a bridge wallet on the other blockchain and returned to the user's wallet on the other blockchain. The request to burn the quantity of tokens on the one blockchain can be in the form of a smart contract.

One or more blocks in the process 600 can be performed by the enclave 110, the wardens 112A-N, and the first blockchain 104A. One or more blocks in the process 600 can also be performed by other actors, servers, and/or computing environments.

Referring to the process 600, the wardens 112A-N can poll a second blockchain, such as the second blockchain 104B, for updates to a burn address and/or a bridge wallet on the second blockchain 104B (602). Refer to step B in FIG. 4A.

One or more of the wardens 112A-N can identify that a token transfer was made from a user's wallet to the burn address and/or the bridge wallet on the second blockchain 104B in 604. Refer to step C in FIG. 4A.

The enclave 110 can determine whether consensus was reached amongst the wardens 112A-N for the token transfer in 606. Refer to step D in FIG. 4A. If consensus was not reached, then the process 600 can return to block 602. If consensus was reached amongst the wardens 112A-N, then the enclave 110 can generate instructions for releasing a quantity of the token that is held in the bridge wallet on the first blockchain 104A in 608. Refer to step E in FIG. 4B. The instructions can indicate an address of the user's wallet on the first blockchain 104A where the token quantity can be released to. The instructions can also indicate a quantity of the token to release from the bridge wallet on the first blockchain 104A. As described above, the quantity that is released from the bridge wallet and returned to the user's wallet on the first blockchain 104A can correspond to the quantity of the token that was burned on the second blockchain 104B.

Next, the enclave 110 can encrypt the instructions in 610. Refer to step F in FIG. 4B. The enclave 110 can use a private key to encrypt the instructions. The private key can be generated from a master secret key that is used to operate the enclave 110.

The enclave 110 can transmit the encrypted instructions to the wardens 112A-N for verification in 612. Refer to step G in FIG. 4B.

One or more of the wardens 112A-N can verify receipt of the encrypted instructions in 614. Refer to step H in FIG. 4C.

The enclave 110 can then determine whether K of the wardens 112A-N verified receipt of the encrypted instructions in 616. Refer to step I in FIG. 4C. If K of the wardens 112A-N did not verify receipt, then the process 600 can return to block 602. If K of the wardens 112A-N did verify receipt, then the enclave 110 can decrypt the instructions in 618. Refer to step J in FIG. 4C. As described above in reference to FIG. 6, the enclave 110 can decrypt the instructions using a private decryption key that is derived from the master secret key. The enclave 110 can retain the private decryption key and may not transfer the key to the wardens 112A-N. Therefore, the enclave 110 transmits the decrypted instructions to the wardens 112A-N in 620 instead of the encrypted instructions and the decryption key. Refer to step K in FIG. 4C.

The wardens 112A-N can broadcast the decrypted instructions to release the token quantity from the bridge wallet on the first blockchain 104A in 622. Refer to step L in FIG. 4D. The wardens 112A-N, for example, broadcast the instructions to one or more nodes that operate the first blockchain 104A.

Accordingly, the first blockchain 104A can release the token quantity from the bridge wallet and return the token quantity to the user's wallet in 624. Refer to step M in FIG. 4D. For example, one or more of the nodes of the first blockchain 104A can use the decrypted instructions to release the quantity of the token from the bridge wallet to the user's wallet on the first blockchain 104A, using the address of the user's wallet that is identified in the instructions.

Figure 7:
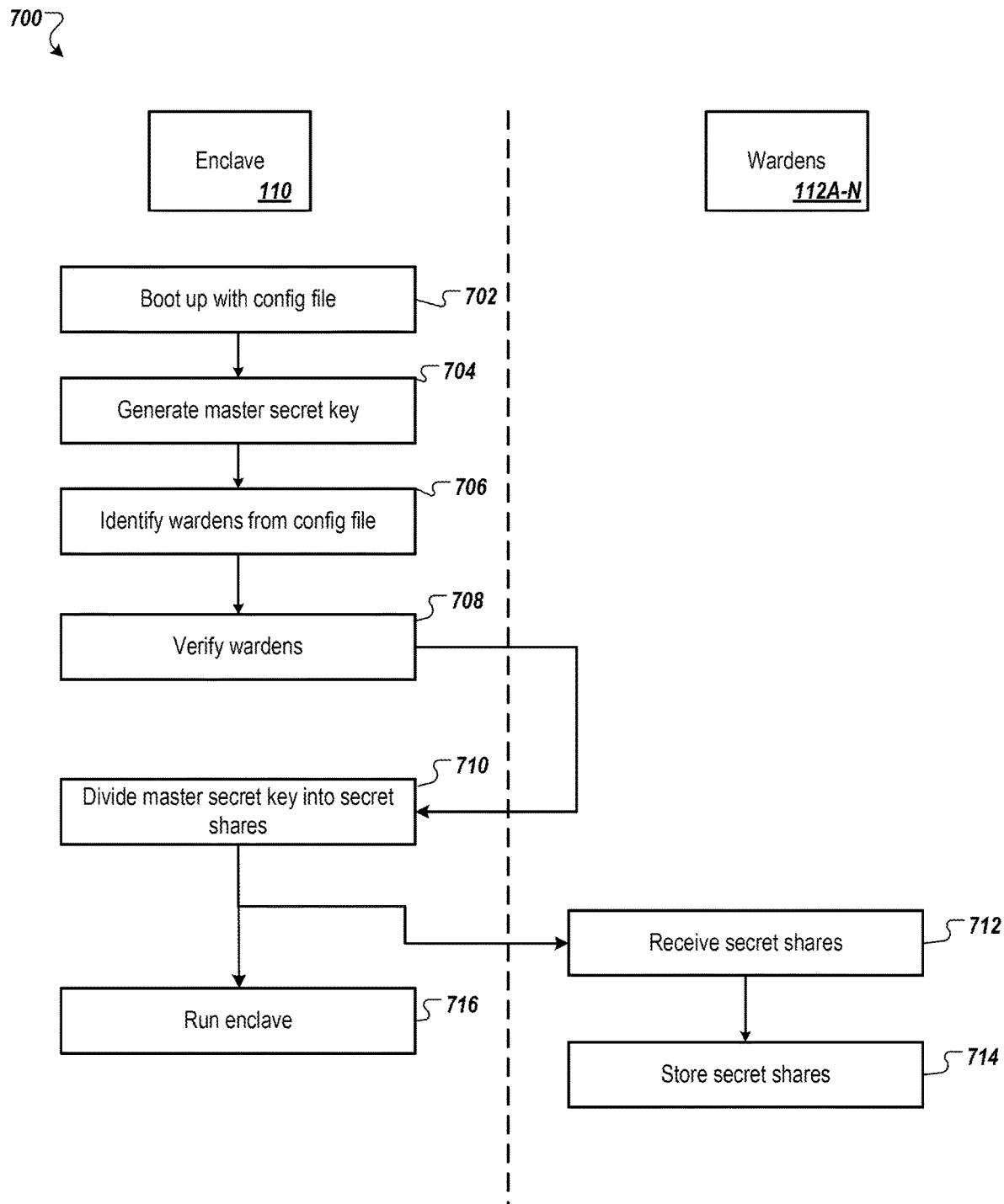
FIG. 7 is a swimlane diagram of a process for starting up an enclave.

FIG. 7 is a swimlane diagram of a process 700 for starting up an enclave. The process 700 can be performed whenever an enclave, such as the enclave 110 is instantiated. One or more blocks in the process 700 can be performed by the enclave 110 and the wardens 112A-N. One or more blocks in the process 700 can also be performed by other actors, servers, and/or computing environments.

Referring to the process 700, the enclave 110 can boot up with a config file in 702. The config file can be a secure codebase that is used by an operator to establish the enclave 110. The config file can include information such as addresses and/or domains that identify the wardens 112A-N that will preside over the enclave 110, the bridge, and the networks or blockchains that are bridged. The config file can also include instructions for generating a master secret key for the enclave 110. Moreover, the config file can indicate which networks or blockchains that the bridge will exist between.

Using the config file, the enclave 110 can generate the master secret key in 704. The master secret key can be a cryptographically secure random key. All other private keys and other secret values can be deterministically derived from this master secret key. As described throughout this disclosure, the master secret key can be used to derive private keys that can be used by the enclave 110 to encrypt and decrypt instructions. The master secret key can also be used to boot up the enclave 110 in the event that the enclave 110 goes down and needs to restart. Moreover, the master secret key can be used to establish a new enclave that can continue performing the transactions of the prior enclave.

The enclave 110 can also add a checksum to the master secret key when it is generated. Adding the checksum can be advantageous to resolve potential situations in which the enclave 110 makes a request to a warden to get its secret share and the warden is unable to verify that the request originated from within a valid enclave. In such situations, an operator of the enclave can maliciously collect secret shares from each warden. Similarly, an operator can maliciously set secret shares that they generated outside of the enclave 110 since the wardens may not know if the setting request properly came from the enclave 110. Moreover, a single malicious warden can provide an incorrect secret share, thereby causing the bridge to regenerate the wrong master secret key. Adding the checksum to the master secret key can resolve these situations. For example, after generating the master secret key, the value of the key will be random and followed by a last 4 bytes of a SHA256 hash of the key. This way, the enclave 110 can immediately check if the master secret key it regenerates using the secret shares from the wardens 112A-N is correct. If the checksum does not match, then the enclave 110 can try to regenerate the master secret key using a different group of the secret shares that it obtains from the wardens 112A-N. In some implementations, any group of a secret share threshold from a total number of the secret shares can be used to regenerate the master secret key.

The enclave 110 can also identify which entities will be acting as the wardens 112A-N in 706. As mentioned above, the config file can include addresses, domains, or other identifiers that can be used to identify the entities that have been chosen as the wardens 112A-N.

The enclave 110 can then verify the wardens 112A-N in 708. Verifying the wardens 112A-N can include establishing a connection with each of the wardens 112A-N using the addresses of the wardens 112A-N. SSL certificate verification techniques and/or TLS can also be used to verify that the wardens 112A-N are in fact the correct wardens 112A-N to preside over this secure enclave environment. Moreover, during verification, the wardens 112A-N can perform remote attestation. The wardens 112A-N may not yet trust a bridge that is established by the enclave 110 since the wardens 112A-N may not be sure whether the bridge is operating within the enclave 110. Thus, with remote attestation, the enclave 110 can send a request to the wardens 112A-N to start up. The wardens 112A-N can initiate remote attestation to ensure the bridge is running in the enclave 110 and using the correct config file. Remote attestation can occur whenever the enclave 110 starts up for a first time or subsequent times. Remote attestation provides for the wardens 112A-N to trust the enclave 110 so that the enclave 110 can share portions of the master secret key with the wardens 112A-N.

Once the wardens 112A-N are verified (and remote attestation is completed), the enclave 110 can divide the master secret key into secret shares in 710. The master secret key can be divided into a number of secret shares that equals a quantity of the wardens 112A-N. Therefore, if there are 10 verified wardens 112A-N, then the master secret key can be divided into 10 secret shares. The master secret key can be divided into as many secret shares as instructed in the config file. For example, in some implementations, the master secret key can be divided into a number of secret shares that is less than the quantity of wardens 112A-N. In some implementations, the master secret key can be divided into a number of secret shares that is greater than the quantity of wardens 112A-N.

The secret shares can be distributed amongst the wardens 112A-N. Thus, each of the wardens 112A-N (or a subset of the wardens 112A-N) can receive a secret share in 712. The wardens 112A-N can verify the secret shares, for example using remote attestation, in order to verify that the enclave 110 is operating with the correct config file and in a secure environment. Distributing the secret shares of the master secret key can be advantageous to secure the enclave 110 and prevent attacks or other security compromises on the enclave 110. Moreover, no one warden can act alone or maliciously in the enclave 110 with one of the secret shares. Changes to the enclave 110 and transactions that occur in the enclave 110 can be made only by pooling the secret shares and reassembling the master secret key with K of the secret shares.

Accordingly, each of the wardens 112A-N can store their secret shares of the master secret key in 714. The secret shares can be stored in private data stores or databases, such as the private data store 202 depicted and described in FIG. 2. Whenever the enclave 110 starts up or restarts, for example, the enclave 110 can retrieve the secret shares from the wardens 112A-N in order to regenerate the master secret key.

Once the enclave 110 transmits the secret shares to the wardens 112A-N, the enclave can run in 716. In other words, the enclave 110 can operate to perform transactions that affect states of the blockchains that are bridged. For example, the enclave 110 can now complete or otherwise authorize minting and burning transactions as described in reference to FIGS. 1-6. Running the enclave 110 includes starting the bridge. A smart contract can be created by the enclave 110 for each supported asset between the first and second blockchains. For example, in some implementations a creator smart contract can be invoked by the enclave to create any necessary smart contracts for the supported asset(s).

Figure 8:
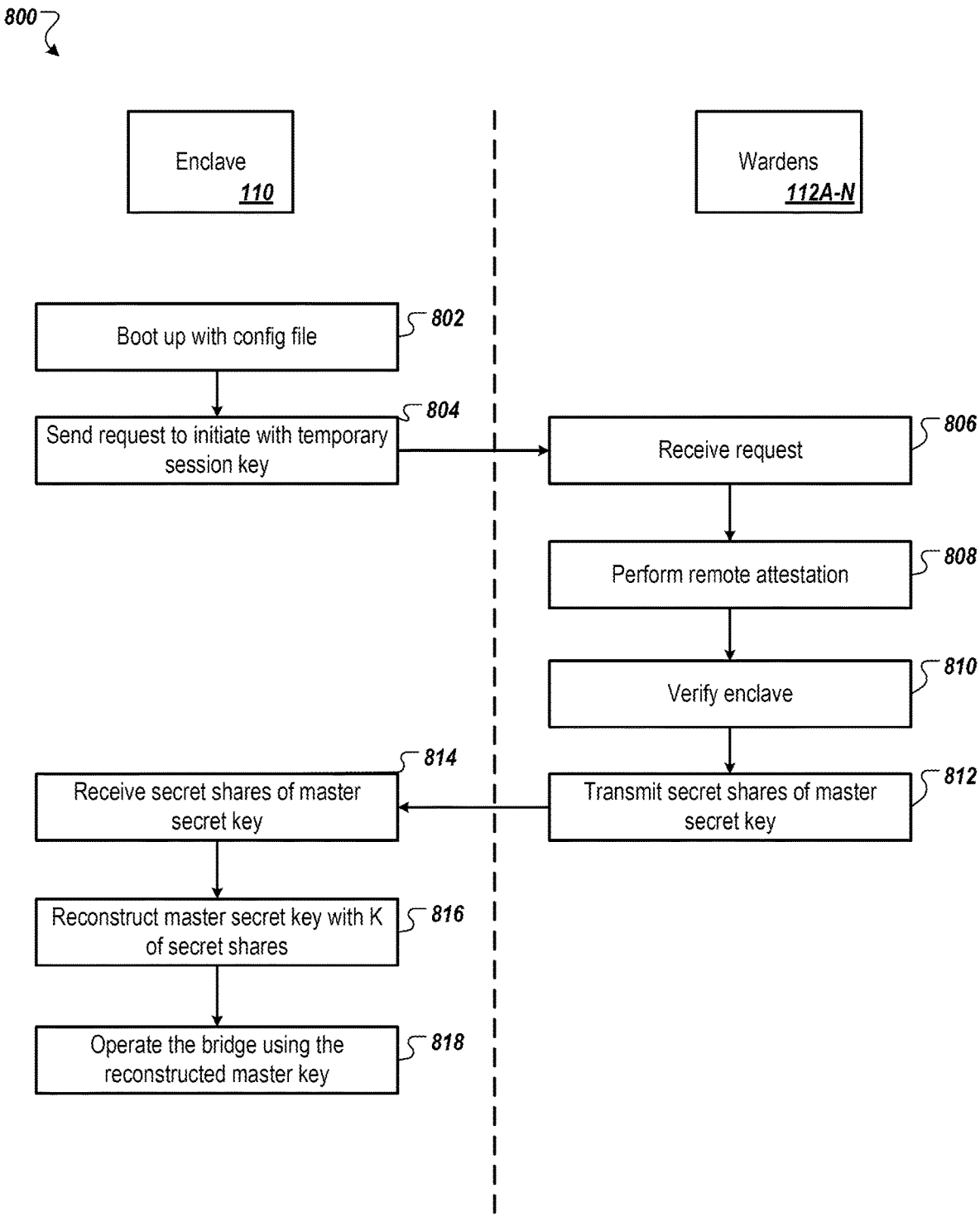
FIG. 8 is a swimlane diagram of a process for remote attestation of the enclave during enclave startup.

FIG. 8 is a swimlane diagram of a process 800 for remote attestation of the enclave 110 during enclave startup. The process 800 can be performed whenever the enclave 110 or another enclave is booted up and/or restarted. Performing the process 800 can be advantageous to ensure that the enclave 110 is running with valid, secure code so that the enclave 110 can be trusted. One or more blocks in the process 800 can be performed by the enclave 110 and the wardens 112A-N. One or more blocks in the process 800 can also be performed by other actors, servers, and/or computing environments.

Referring to the process 800, the enclave 110 can boot up with a config file in 802. Refer to block 702 in FIG. 7 for discussion on the config file. Block 802 can occur when the enclave 110 is booted up for the first time. Block 802 can also occur when the enclave 110 goes down and is being restarted.

The enclave 110 can then send a request to initiate with a temporary session key in 804. Instructions for the send request can be derived from the config file. The wardens 112A-N can receive the request in 806. The wardens 112A-N can then perform remote attestation in 808 in order to verify the enclave 110 in 810. The enclave 110 must send the temporary session key before being able to receive the secret shares of the master secret key from any of the wardens 112A-N.

When the wardens 112A-N receive the request, they may not know whether that request originated from within a valid enclave. Therefore, when the wardens 112A-N receive the request, the wardens 112A-N can perform remote attestation of the bridge to verify the enclave 110. In some implementations, remote attestation can include retrieving a validated hash value for the enclave 110 that was previously generated from a validated version of the enclave 110. A current hash value that is generated for the enclave 110 can be compared to the validated hash value to determine whether the enclave 110 is in fact secure and valid. In some implementations, a user or other entity at a client computing device can also initiate remote attestation. The client computing device can transmit a request to the enclave 110 and/or any of the wardens 112A-N. The request can, for example, including retrieving the validated hash value for the enclave 110, receiving the current hash value, and performing a comparison of the validated hash value and the current hash value to remotely validate the enclave 110. The current hash value can be retrieved from another computer system that makes the validated hash value for the enclave 110 publicly accessible.

If remote attestation fails, the request can be rejected by the wardens 112A-N. In other words, the wardens 112A-N can determine that a malicious operator may be trying to run the enclave 110 and the bridge therein. The wardens 112A-N may not transmit their secret shares of the master secret key to the enclave 110 when remote attestation fails.

When remote attestation passes, the wardens 112A-N can share their secret shares with the enclave 110 (e.g., derived using a Diffie-Hellman key exchange in the remote attestation process). As described throughout this disclosure, remote attestation can pass when the wardens 112A-N verify, collectively, that a valid and secure enclave is in communication with the wardens 112A-N and that the enclave 110 is running with the correct config file. A checksum can be run, as described above, to determine, by the wardens 112A-N, whether the enclave 110 is running valid and secure code.

Accordingly, once the enclave 110 is verified in 810, the wardens 112A-N can transmit their secret shares of the master secret key to the enclave 110. Trust has been established between the wardens 112A-N and the enclave 110. The enclave 110 can receive the secret shares of the master secret key in 814.

The enclave 110 can then use the secret shares to encrypt a secret share that the enclave 110 may return on a response and can also provide the remote attestation context that was used as part of the remote attestation process in 808. The enclave 110 can decrypt the secret shares of the wardens 112A-N by using the same shared secret. Since the enclave 110 can request the secret shares from the wardens 112A-N before setting the secret shares, the enclave 110 can also encrypt the secret shares that it sends to each of the wardens 112A-N using these shared secrets for remote attestation. This way, the wardens 112A-N can verify that the secret shares were in fact generated by the enclave 110 itself, and know that the wardens 112A-N are not providing the secret shares to any entity other than the enclave 110.

The enclave 110 can reconstruct the master secret key using K of the received secret shares in 816. In some implementations, the master secret key can be properly reconstructed with less than all of the secret shares. In some implementations, the master secret key can be reconstructed with all of the secret shares. The config file can identify K, or how many of the secret shares may be needed to reconstruct the master secret key.

Once the master secret key is reconstructed, the enclave 110 can operate the bridge using the key in 818. For example, transactions, such as minting and releasing tokens, can be performed across chains that are connected via the bridge.

Figure 9:
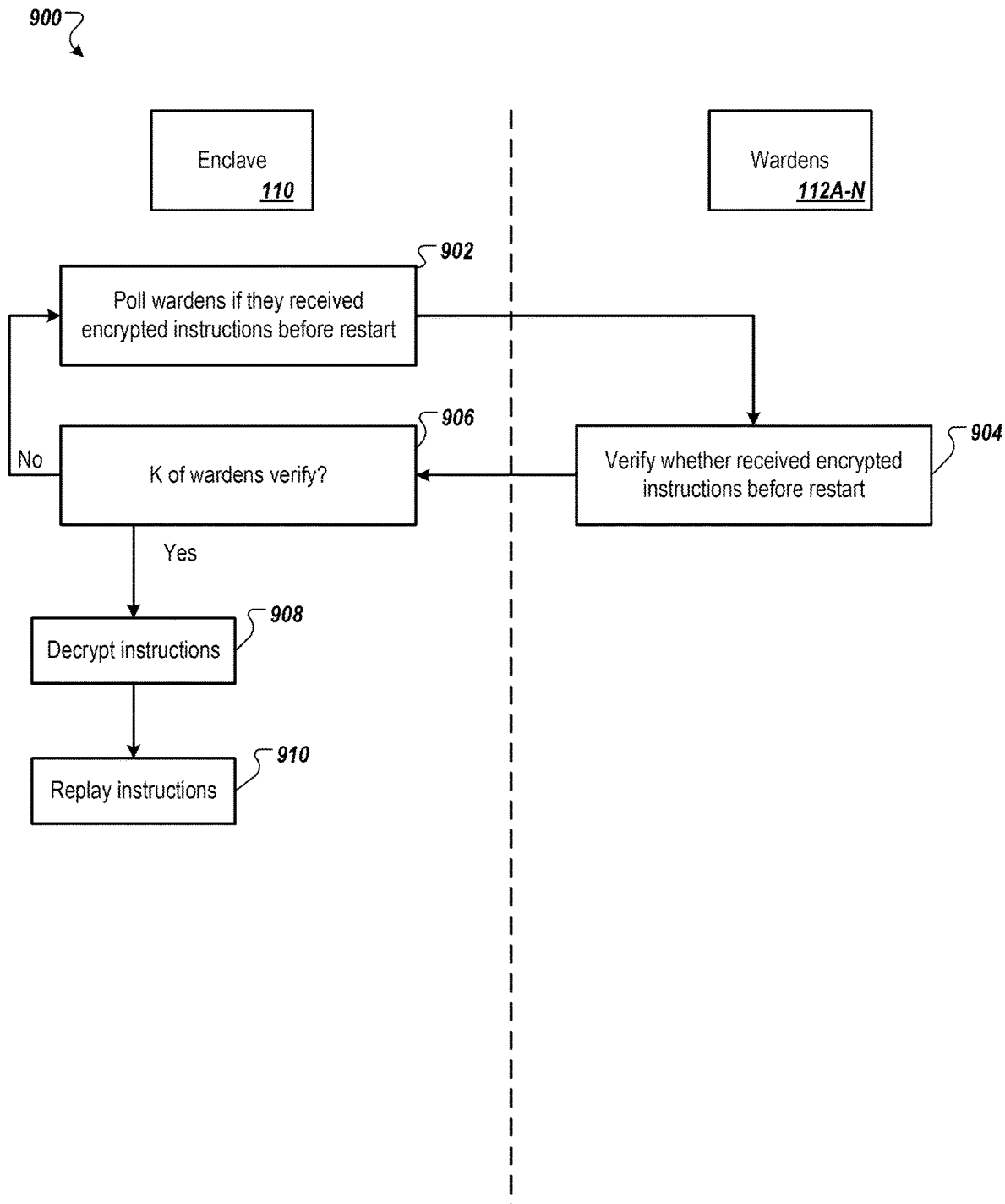
FIG. 9 is a swimlane diagram of a process for restarting the enclave.

FIG. 9 is a swimlane diagram of a process 900 for restarting the enclave 110. The process 900 can be performed whenever the enclave 110 boots up for the first time and/or goes down for some reason. As described throughout, the enclave 110 is stateless. When the enclave 110 boots back up, the enclave 110 can poll the wardens 112A-N to determine which mint and/or burn transactions are currently being performed, queued, completed, and/or stopped at a time that the enclave 110 went down. Therefore, the enclave 110 can pick up with completing the mint and/or burn transactions as if the enclave 110 never went down in the first place. The process 900 can occur after the processes 700 and/or 800. The process 900 can be performed when the enclave 110 goes down after encrypting instructions for minting or releasing tokens (e.g., refer to steps F in FIGS. 3B and 4B) and/or when the encrypted instructions are transmitted to the wardens 112A-N for verification (e.g., refer to steps G in FIGS. 3B and 4B).

One or more blocks in the process 900 can be performed by the enclave 110 and the wardens 112A-N. One or more blocks in the process 900 can also be performed by other actors, servers, and/or computing environments.

Referring to the process 900, once the enclave 110 is booted up (e.g., remote attestation is performed and the wardens 112A-N verify that the enclave 110 is operating with valid code in a secure environment), the enclave 110 can poll the wardens 112A-N to determine whether the wardens 112A-N have received any encrypted instructions before the enclave 110 restarted (902). The encrypted instructions, as described in reference to FIGS. 3-6 can include instructions for minting and/or burning tokens on respective blockchains.

The wardens 112A-N can then verify whether they received the encrypted instructions before the enclave 110 went down and then restarted (904). As described in reference to FIG. 2, the wardens 112A-N can index transactions and activity that occurs on the first and second blockchains 104A and 104B in the private data store 202. The wardens 112A-N can, therefore, search the index for the encrypted instructions.

The enclave 110 can determine whether K of the wardens 112A-N verified receipt in 906. As described throughout this disclosure, K can be any value that is equal to or greater than a majority of the wardens 112A-N. If K of the wardens 112A-N do not verify receipt of the encrypted instructions before restart, then any of the wardens 112A-N that did verify receipt may be acting maliciously. Thus, the enclave 110 may not continue with decrypting the instructions and broadcasting them on the respective blockchain. When the enclave 110 is unable to verify that K of the wardens 112A-N received the encrypted instructions, the process 900 can restart, and the enclave 110 can keep polling the wardens 112A-N until enough of the wardens 112A-N (e.g., K of N wardens) are back online and/or verify receipt of the encrypted instructions.

Sometimes, the enclave 110 may not have to receive receipt verifications from K of the wardens 112A-N. Instead, the enclave 110 can receive a single copy of the encrypted and signed instructions from one of the wardens 112A-N. Upon receiving the encrypted instructions, the enclave 110 can send the instructions to any of the wardens 112A-N that did not previously receive the encrypted instructions. Once the enclave confirms that K of the wardens 112A-N have the encrypted instructions, thereby making it fault tolerant, the enclave 110 can send the decrypted version of the instructions to the wardens 112A-N.

If K of the wardens 112A-N do verify receipt of the encrypted instructions before restart in 906 (or the enclave 110 receives the encrypted and signed instructions from one of the wardens 112A-N), then the enclave 110 can determine that instructions to mint or release tokens had been generated but not completed before the enclave 110 went down. Thus, the enclave 110 can decrypt the instructions in 908, as described throughout this disclosure. For example, the wardens 112A-N can transmit the encrypted instructions back to the enclave 110. The enclave 110 can decrypt the instructions using a private decryption key that is held by the enclave 110 and derived from the master secret key.

The enclave 110 can then replay the decrypted instructions in 910. Replaying the instructions can include transmitting the decrypted instructions to the wardens 112A-N. The wardens 112A-N can then broadcast the instructions to the nodes of the respective blockchain such that the instructions can be executed and completed as if the enclave 110 never went down. In such a scenario, even if the wardens 112A-N rebroadcast instructions that have already been broadcasted and accepted, those instructions can just be ignored—the nodes of the respective blockchain may not unlock or otherwise transfer tokens from one user wallet to another if they have already been unlocked or transferred.

Figure 10:
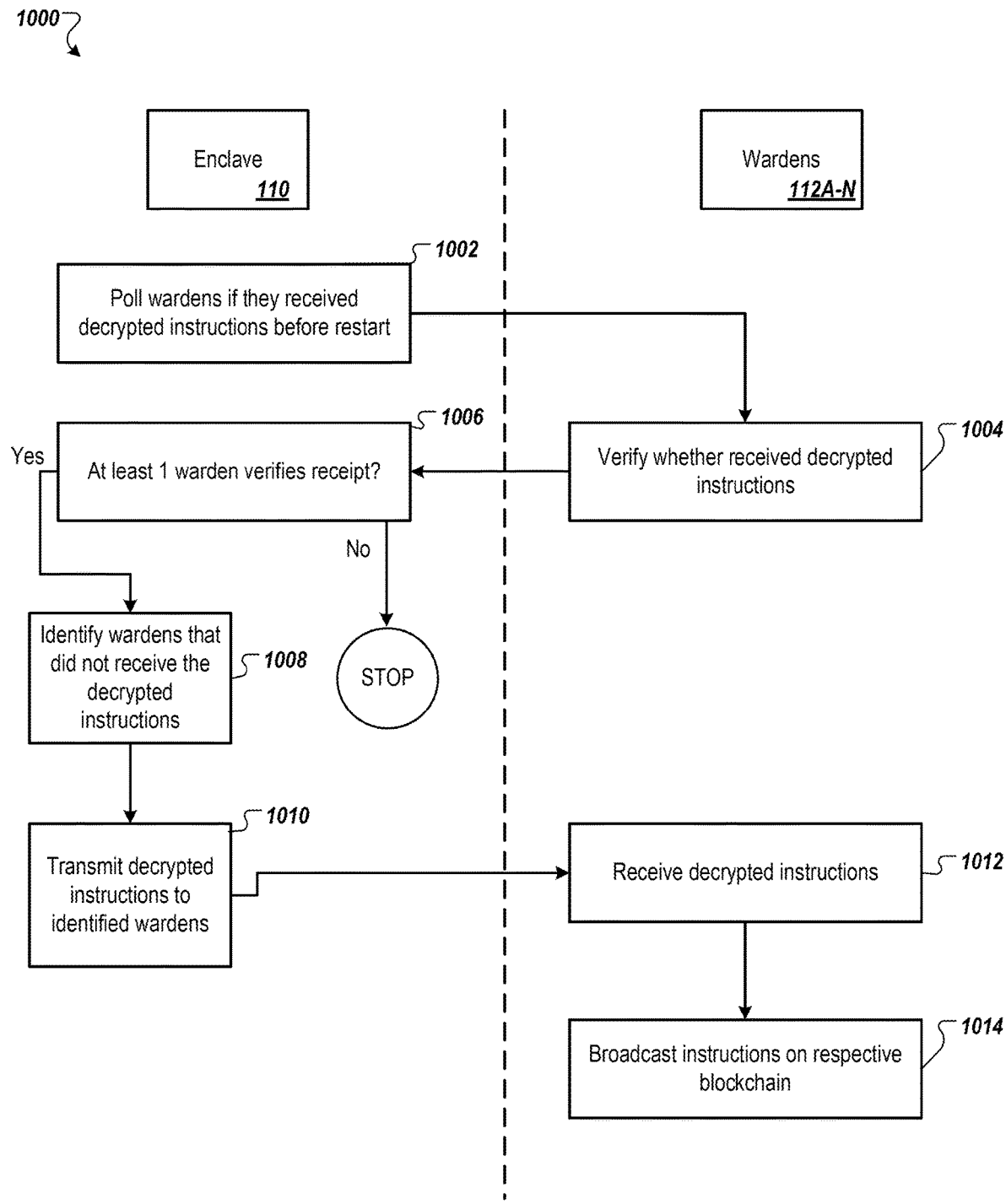
FIG. 10 is a swimlane diagram of another process for restarting the enclave.

FIG. 10 is a swimlane diagram of another process 1000 for restarting the enclave 110. For example, the process 1000 can occur when the enclave 110 goes down after the encrypted transaction(s) are sent to the wardens 112A-N for verification (e.g., refer to steps G in FIGS. 3B and 4B) and, optionally, after the wardens 112A-N verify receipt of the encrypted instructions (e.g., refer to steps H in FIGS. 3C and 4C). The process 1000 can also be performed when the enclave 110 goes down after the enclave 110 decrypts the instructions (e.g., refer to steps J in FIGS. 3C and 4C) and/or when the enclave 110 transmits the decrypted instructions to the wardens 112A-N (e.g., refer to steps K in FIGS. 3C and 4C).

One or more blocks in the process 1000 can be performed by the enclave 110 and the wardens 112A-N. One or more blocks in the process 1000 can also be performed by other actors, servers, and/or computing environments.

Referring to the process 1000, the enclave 110 can poll the wardens 112A-N to determine whether the wardens 112A-N received the decrypted instructions before the enclave 110 restarted (1002). The wardens 112A-N can verify whether they received the decrypted instructions in 1004. Refer to block 904 in FIG. 9 for discussion about verifying receipt of the instructions.

The enclave 110 can then determine whether at least 1 of the wardens 112A-N verified receipt of the decrypted instructions in 1006. 1 warden can be enough to verify receipt of the decrypted instructions because if 1 warden received the decrypted instructions, then at least a majority of the wardens 112A-N had already verified receipt of the encrypted instructions before the enclave 110 went down. Thus, the wardens 112A-N were already verified and could be trusted by the enclave 110 to execute the instructions. Moreover, if at least 1 warden verifies receipt of the decrypted instructions, then this can indicate that the enclave 110 went down before any of the other wardens 112A-N could receive the decrypted instructions. Receipt of the decrypted instructions can also indicate that the minting and/or burning transaction went through before the enclave 110 went down.

If not even 1 of the wardens 112A-N verifies receipt of the decrypted instructions before the enclave 110 went down, then the process 1000 can stop. Sometimes, on restart, the enclave 110 can poll the wardens 112A-N for encrypted instructions. Any of the wardens 112A-N that received the corresponding decrypted instructions can respond with nothing. If the enclave 110 receives encrypted instructions from at least one of the wardens 112A-N, it can send the encrypted instructions to the remaining wardens 112A-N. It can then send the decrypted version of the instructions to all of the wardens 112A-N. When none of the wardens 112A-N previously received the decrypted instructions, then the instructions can be broadcasted and added to the blockchain. Otherwise, if the instructions have already been broadcasted, the transaction associated with the instructions would have no effect on the blockchain.

As mentioned above, if at least one of the wardens 112A-N verifies receipt of the decrypted instructions in 1006, the enclave 110 can determine that the instructions may have been broadcasted by at least one warden to the respective blockchain. To ensure that the instructions are actually broadcasted for the nodes of the respective blockchain to complete the corresponding transaction (e.g., minting or burning tokens), the enclave 110 can identify which of the wardens 112A-N did not receive the decrypted instructions in 1008. To do so, the enclave 110 can merely identify which of the wardens 112A-N verified receipt of the decrypted instructions and then select all of the wardens 112A-N that were polled but did not verify receipt.

The enclave 110 can transmit the decrypted instructions to the identified wardens in 1010. The wardens 112A-N can receive the decrypted instructions in 1012. The wardens 112A-N can then broadcast the instructions on the respective blockchain in 1014 such that the minting and/or unlocking and transferring of tokens can be completed.

Figure 11:
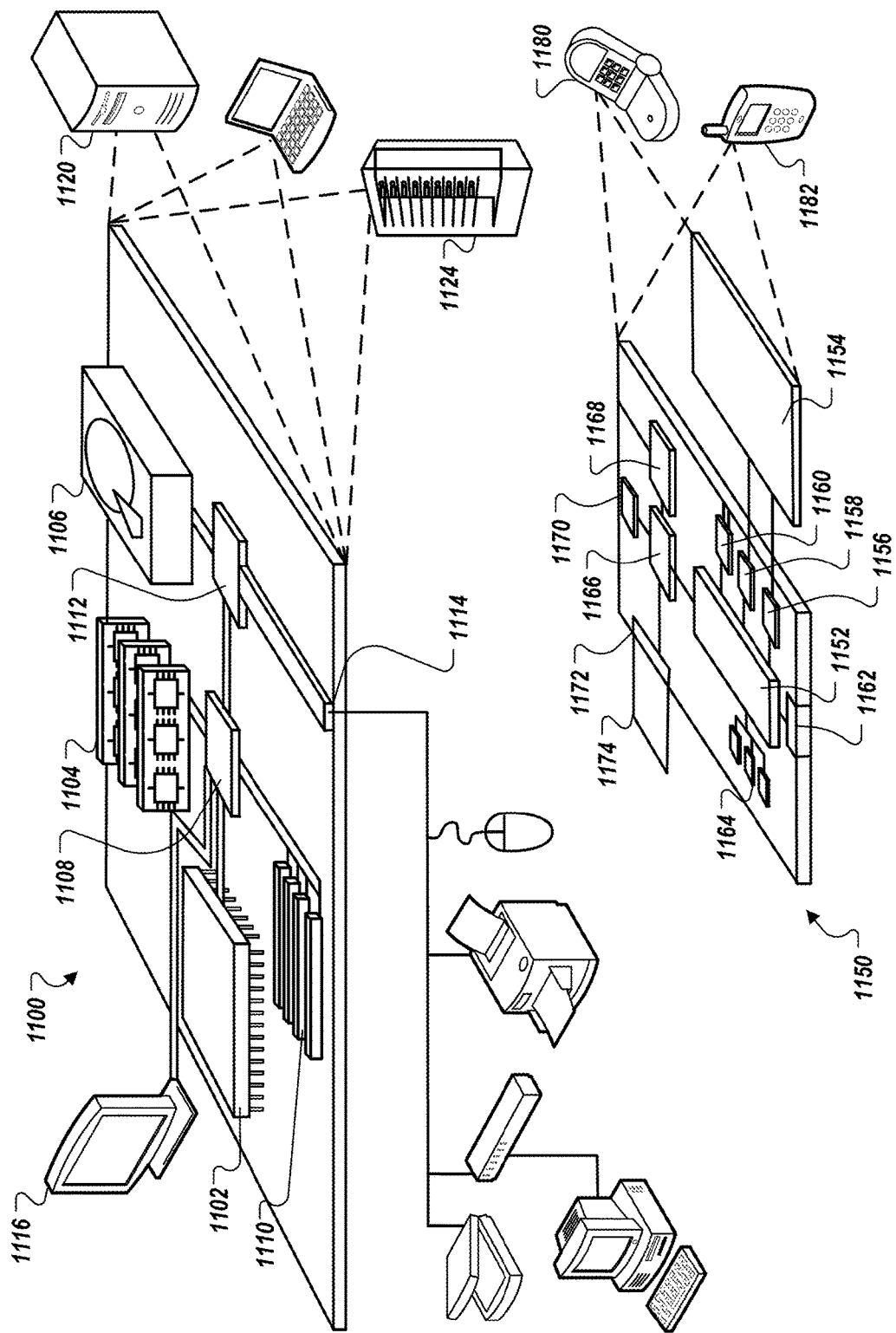
FIG. 11 is a schematic diagram that shows an example of a computing device and a mobile computing device.

FIG. 11 shows an example of a computing device 1100 and an example of a mobile computing device that can be used to implement the techniques described here. The computing device 1100 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1100 includes a processor 1102, a memory 1104, a storage device 1106, a high-speed interface 1108 connecting to the memory 1104 and multiple high-speed expansion ports 1110, and a low-speed interface 1112 connecting to a low-speed expansion port 1114 and the storage device 1106. Each of the processor 1102, the memory 1104, the storage device 1106, the high-speed interface 1108, the high-speed expansion ports 1110, and the low-speed interface 1112, are interconnected using various busses, and can be mounted on a common motherboard or in other manners as appropriate. The processor 1102 can process instructions for execution within the computing device 1100, including instructions stored in the memory 1104 or on the storage device 1106 to display graphical information for a GUI on an external input/output device, such as a display 1116 coupled to the high-speed interface 1108. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1104 stores information within the computing device 1100. In some implementations, the memory 1104 is a volatile memory unit or units. In some implementations, the memory 1104 is a non-volatile memory unit or units. The memory 1104 can also be another form of computer-readable medium, such as a magnetic or optical disk.

The storage device 1106 is capable of providing mass storage for the computing device 1100. In some implementations, the storage device 1106 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1104, the storage device 1106, or memory on the processor 1102.

The high-speed interface 1108 manages bandwidth-intensive operations for the computing device 1100, while the low-speed interface 1112 manages lower bandwidth-intensive operations. Such allocation of functions is exemplary only. In some implementations, the high-speed interface 1108 is coupled to the memory 1104, the display 1116 (e.g., through a graphics processor or accelerator), and to the high-speed expansion ports 1110, which can accept various expansion cards (not shown). In the implementation, the low-speed interface 1112 is coupled to the storage device 1106 and the low-speed expansion port 1114. The low-speed expansion port 1114, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1100 can be implemented in a number of different forms, as shown in the figure. For example, it can be implemented as a standard server 1120, or multiple times in a group of such servers. In addition, it can be implemented in a personal computer such as a laptop computer 1122. It can also be implemented as part of a rack server system 1124. Alternatively, components from the computing device 1100 can be combined with other components in a mobile device (not shown), such as a mobile computing device 1150. Each of such devices can contain one or more of the computing device 1100 and the mobile computing device 1150, and an entire system can be made up of multiple computing devices communicating with each other.

The mobile computing device 1150 includes a processor 1152, a memory 1164, an input/output device such as a display 1154, a communication interface 1166, and a transceiver 1168, among other components. The mobile computing device 1150 can also be provided with a storage device, such as a micro-drive or other device, to provide additional storage. Each of the processor 1152, the memory 1164, the display 1154, the communication interface 1166, and the transceiver 1168, are interconnected using various buses, and several of the components can be mounted on a common motherboard or in other manners as appropriate.

The processor 1152 can execute instructions within the mobile computing device 1150, including instructions stored in the memory 1164. The processor 1152 can be implemented as a chipset of chips that include separate and multiple analog and digital processors. The processor 1152 can provide, for example, for coordination of the other components of the mobile computing device 1150, such as control of user interfaces, applications run by the mobile computing device 1150, and wireless communication by the mobile computing device 1150.

The processor 1152 can communicate with a user through a control interface 1158 and a display interface 1156 coupled to the display 1154. The display 1154 can be, for example, a TFT (Thin-Film-Transistor Liquid Crystal Display) display or an OLED (Organic Light Emitting Diode) display, or other appropriate display technology. The display interface 1156 can comprise appropriate circuitry for driving the display 1154 to present graphical and other information to a user. The control interface 1158 can receive commands from a user and convert them for submission to the processor 1152. In addition, an external interface 1162 can provide communication with the processor 1152, so as to enable near area communication of the mobile computing device 1150 with other devices. The external interface 1162 can provide, for example, for wired communication in some implementations, or for wireless communication in other implementations, and multiple interfaces can also be used.

The memory 1164 stores information within the mobile computing device 1150. The memory 1164 can be implemented as one or more of a computer-readable medium or media, a volatile memory unit or units, or a non-volatile memory unit or units. An expansion memory 1174 can also be provided and connected to the mobile computing device 1150 through an expansion interface 1172, which can include, for example, a SIMM (Single In Line Memory Module) card interface. The expansion memory 1174 can provide extra storage space for the mobile computing device 1150, or can also store applications or other information for the mobile computing device 1150. Specifically, the expansion memory 1174 can include instructions to carry out or supplement the processes described above, and can include secure information also. Thus, for example, the expansion memory 1174 can be provided as a security module for the mobile computing device 1150, and can be programmed with instructions that permit secure use of the mobile computing device 1150. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1164, the expansion memory 1174, or memory on the processor 1152. In some implementations, the computer program product can be received in a propagated signal, for example, over the transceiver 1168 or the external interface 1162.

The mobile computing device 1150 can communicate wirelessly through the communication interface 1166, which can include digital signal processing circuitry where necessary. The communication interface 1166 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1168 using a radio-frequency. In addition, short-range communication can occur, such as using a Bluetooth, WiFi, or other such transceiver (not shown). In addition, a GPS (Global Positioning System) receiver module 1170 can provide additional navigation- and location-related wireless data to the mobile computing device 1150, which can be used as appropriate by applications running on the mobile computing device 1150.

The mobile computing device 1150 can also communicate audibly using an audio codec 1160, which can receive spoken information from a user and convert it to usable digital information. The audio codec 1160 can likewise generate audible sound for a user, such as through a speaker, e.g., in a handset of the mobile computing device 1150. Such sound can include sound from voice telephone calls, can include recorded sound (e.g., voice messages, music files, etc.) and can also include sound generated by applications operating on the mobile computing device 1150.

The mobile computing device 1150 can be implemented in a number of different forms, as shown in the figure. For example, it can be implemented as a cellular telephone 1180.

It can also be implemented as part of a smart-phone 1182, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

Example Embodiments Include:

1. A system for providing the secure transfer of assets between blockchain networks, the system comprising:
    a storage device that is configured to store a bridge program that is programmed to perform (i) lock operations that lock native assets from a first blockchain network and mint synthetic assets representing the native assets in a second blockchain network, and (ii) unlock operations that unlock the native assets by transferring the native assets to an address in the first blockchain network in response to the synthetic assets being returned or destroyed; and
    a computer system that is configured to load and execute the bridge program, including performing the lock operations and the unlock operations to provide a bridge between the first blockchain network and the second blockchain network.

2. The system of embodiment 1, wherein:
    the computer system includes a secure computing enclave that is configured to provide a trusted execution environment within which processing of programs is secure from observation and manipulation by other operations outside of the secure enclave,
    execution of the bridge program in the secure enclave comprises:
        loading the bridge program from the storage device into secure memory within the secure enclave;
        performing an attestation operation on the bridge program loaded into the secure memory within the secure enclave, the attestation operation configured to validate the bridge program; and
        outputting results of the attestation operation to identify whether the bridge program loaded in the secure enclave is valid.

3. The system of embodiment 2, wherein:
    the bridge program is stored in the storage device,
    the secure enclave is programmed to generate a signature of the bridge program loaded into the secure memory, and
    the signature of the bridge program loaded into the secure memory is used to verify the bridge program as part of the attestation operation.

4. The system of embodiment 3, wherein:
    performing the attestation operation comprises performing a hash operation on at least a portion of the bridge program in the secure memory to generate the signature, and
    the results comprise the signature including a hash value generated by performing the hash operation.

5. The system of embodiment 2, wherein one or more other computing devices are programmed to request the attestation operation be performed and to compare the results against a validated attestation value stored on a third party server system for the bridge program.

6. The system of embodiment 1, wherein:
first wallets on the first blockchain network include first private keys and first public keys,
second wallets on the second blockchain network include second private keys and second public keys,
the first private keys are the same as the second private keys across the first blockchain network and the second blockchain network.

7. The system of embodiment 6, wherein the first public keys for the first wallets are the same as the second public keys for the second wallets.

8. The system of embodiment 6, wherein the first public keys for the first wallets are different from the second public keys for the second wallets.

9. The system of embodiment 6, wherein the second public keys associated with the second private keys for the second wallets are configured to be recovered from first signatures associated with transactions with the first wallets on the first blockchain network.

10. The system of embodiment 9, wherein the second public keys for the second wallets comprising an minting address to receive the minted synthetic assets on the second blockchain network are configured to be determined by the bridge program using the public key recovered from the first signatures from the first wallet on the first blockchain network.

11. The system of embodiment 6, wherein the first public keys associated with the first private keys for the first wallets are configured to be recovered from second signatures associated with transactions with the second wallets on the second blockchain network.

12. The system of embodiment 11, wherein the first public keys for the first wallets comprising the address for receiving the unlocked native assets on the first blockchain network are configured to be determined by the bridge program using the second signatures from the second wallet on the second blockchain network.

13. The system of embodiment 1, further comprising:
remote warden systems that are each configured to maintain a secret share of a private key for the bridge program that is used to perform the lock operations and the unlock operations to lock the native assets and to mint synthetic assets, wherein the secret shares maintained by each of the remote warden systems are configured to be used in combination to regenerate the private key.

14. The system of embodiment 13, wherein each of the remote warden systems are further configured to:
store a portion of a pool of shared secrets that, collectively, are capable of being used to instantiate a new instance of the bridge program, and
in the event that a first instance of the bridge program fails, to provide the portion of the pool of shared secrets to a second instance of the bridge program upon instantiation.

15. The system of embodiment 14, wherein each of the remote warden systems is configured to provide the portion of the pool of shared secrets to the second instance of the bridge program in response to the second instance of the bridge program being validated using an attestation operation by the remote warden systems.

16. The system of embodiment 15, wherein each of the remote warden systems is configured to provide information related to the first blockchain network and the second blockchain network to the second instance of the bridge program.

17. The system of embodiment 13, wherein:
the remote warden systems are configured to receive an encrypted transaction from the bridge to confirm asset operations were performed on the first blockchain network and the second blockchain network, and
the bridge program is further configured to validate that the asset operations were successfully performed on the first blockchain network and the second blockchain network in response to receiving the confirmation from at least a threshold of the remote warden systems.

18. The system of embodiment 17, wherein the threshold comprises at least a majority of the remote warden systems.

19. The system of embodiment 17, wherein the asset operations comprise the native assets being transferred to a wallet associated with the bridge on the first blockchain network.

20. The system of embodiment 19, wherein the bridge program is further configured to only mint the synthetic assets in response to at least the threshold of the remote warden systems confirming that the natives assets have been transferred to the wallet associated with the bridged in the first blockchain network.

21. The system of embodiment 20, wherein the remote warden systems are configured to automatically notify the bridge program of the native assets being transferred to the wallet associated with the bridge in the first blockchain network without prompting by the bridge program.

22. The system of embodiment 17, wherein the asset operations comprise the synthetic assets being minted on the second blockchain network.

23. The system of embodiment 17, wherein the asset operations comprise the synthetic assets being returned or destroyed on the second blockchain network.

24. The system of embodiment 23, wherein the bridge program is further configured to only unlock the native assets in response to at least the threshold of the remote warden systems confirming that the synthetic assets have been returned or destroyed on the second blockchain network.

25. The system of embodiment 24, wherein the remote warden systems are configured to automatically notify the bridge program of the synthetic assets being returned or destroyed in the second blockchain network without prompting by the bridge program.

26. The system of embodiment 17, wherein the asset operations comprise the native assets being unlocked on the first blockchain network.

27. The system of embodiment 17, wherein the bridge program is configured to be modified by (i) generating a new private key associated with a new wallet for the bridge program, (ii) modifying on-chain smart contracts on one or more of the first blockchain network and the second blockchain network with regard to the new private key, and (iii) moving the native assets to the new wallet associated with the new private key.

28. System in embodiment 17, wherein the bridge program is configured to execute a cross-chain smart contract during a cross-chain asset transfer, wherein the cross-chain smart contract is executed inside a secure enclave.

29. The system of embodiment 28, wherein the cross-chain smart contract is configured to be used to perform on-chain operations on one or more of the first and second blockchain networks.

30. The system of embodiment 1, wherein fees are collected for the lock operation and the unlock operation.

31. The system of embodiment 30, wherein the bridge program is further configured to provide native coins to a wallet in the second blockchain network as part of the lock operation to pay network transaction fees in the second blockchain network.

32. The system of embodiment 30, wherein the bridge program is further configured to provide native coins to a wallet in the first blockchain network as part of the unlock operation to pay network transaction fees in the first blockchain network.

33. The system of embodiment 30, wherein the fees are determined based on the asset type, the quantity of assets being transferred, and network transaction fees.

34. The system of embodiment 30, wherein the fees for a transaction involving a wallet having credentials in the form of a non-fungible token (NFT) are reduced.

35. The system of embodiment 1, wherein the bridge program is further configured to bidirectionally transfer assets between the first blockchain network and the second blockchain network.

36. The system of embodiment 35, wherein bidirectionally transferring assets comprises the bridge program being configured to perform the lock operation on native assets in the second blockchain and to mint synthetic assets in the first blockchain, and to perform the unlock operation by unlocking native assets in the second blockchain in response to the synthetic assets in the first blockchain being returned or destroyed.

37. The system of embodiment 1, the bridge program is further configured to transfer assets between more than two blockchain networks.

38. The system of embodiment 37, wherein the bridge program is further configured to transfer synthetic assets between a plurality of different non-origin blockchain networks by burning a synthetic assets in a first non-origin blockchain network and minting a new synthetic assets in a second non-origin blockchain network.

39. The system of embodiment 38, wherein the bridge program is further configured to unlock a corresponding native asset in an origin blockchain network in response to the new synthetic asset being returned or destroyed in the second non-origin blockchain network.

What is claimed is:

1. A system to bridge assets between blockchain networks, the system comprising:
a secure module configured to:
provide a trusted computing environment within which processing of programs is secure from observation and manipulation by other operations outside of the secure module;
load a bridge program from memory outside the secure module into secure memory within the secure module, the bridge program comprising instructions that, when executed by the secure module, cause the secure module to perform operations comprising:
accessing a first blockchain network that records transactions of first assets;
accessing a second blockchain network that records transaction of a second asset;
lock some of the first assets of the first blockchain network and correspondingly mint some of the second assets of the second blockchain network; and
unlock the locked first assets of the first blockchain network in response to removal of the minted second assets of the second blockchain network; and
remote warden systems that are each configured to maintain a secret share of secret data for the bridge program to lock the first assets and to mint second assets, wherein the secret shares maintained by each of the remote warden systems are configured to be used in combination to regenerate a private key.

2. The system of claim 1, wherein:
first wallets on the first blockchain network include first private keys and first public keys,
second wallets on the second blockchain network include second private keys and second public keys,
the first private keys are the same as the second private keys across the first blockchain network and the second blockchain network.

3. The system of claim 2, wherein the first public keys for the first wallets are the same as the second public keys for the second wallets.

4. The system of claim 2, wherein the first public keys for the first wallets are different from the second public keys for the second wallets.

5. The system of claim 2, wherein:
the second public keys associated with the second private keys for the second wallets are configured to be recovered from first signatures associated with transactions with the first wallets on the first blockchain network; and
the second public keys for the second wallets comprising a minting address to receive the minted second assets on the second blockchain network are configured to be determined by the bridge program using the public key recovered from the first signatures from the first wallet on the first blockchain network.

6. The system of claim 2, wherein the first public keys associated with the first private keys for the first wallets are configured to be recovered from second signatures associated with transactions with the second wallets on the second blockchain network; and
the first public keys for the first wallets comprising an address for receiving the unlocked first assets on the first blockchain network are configured to be determined by the bridge program using the second signatures from the second wallet on the second blockchain network.

7. The system of claim 1, wherein each of the remote warden systems are further configured to:
store a portion of a pool of shared secrets that, collectively, are capable of being used to instantiate a new instance of the bridge program,
responsive to a determination that a first instance of the bridge program fails, to provide the portion of the pool of shared secrets to a second instance of the bridge program upon instantiation; and
provide the portion of the pool of shared secrets to the second instance of the bridge program in response to the second instance of the bridge program being validated using an attestation operation by the remote warden systems.

8. The system of claim 7, wherein each of the remote warden systems is configured to provide information related to the first blockchain network and the second blockchain network to the second instance of the bridge program.

9. The system of claim 1, wherein:
the remote warden systems are configured to receive an encrypted transaction from the bridge to confirm asset operations were performed on the first blockchain network and the second blockchain network;
the bridge program is further configured to validate that the asset operations were successfully performed on the first blockchain network and the second blockchain network in response to receiving the confirmation from at least a threshold of the remote warden systems; and
the bridge program is further configured, upon restart, to request outstanding encrypted transactions for reissue to the warden systems.

10. The system of claim 9, wherein the threshold comprises at least a majority of the remote warden systems.

11. The system of claim 9, wherein:
the asset operations comprise the first assets being transferred to a wallet associated with the bridge on the first blockchain network; and
the bridge program is further configured to only mint the second assets in response to at least the threshold of the remote warden systems confirming that the firsts assets have been transferred to the wallet associated with the bridge in the first blockchain network; and
the remote warden systems are configured to automatically notify the bridge program of the first assets being transferred to the wallet associated with the bridge in the first blockchain network without prompting by the bridge program.

12. The system of claim 9, wherein:
the asset operations comprise the second assets being removed from the second blockchain network;
the bridge program is further configured to only unlock the first assets in response to at least the threshold of the remote warden systems confirming that the second assets have been removed from the second blockchain network; and
the remote warden systems are configured to automatically notify the bridge program of the second assets being removed from the second blockchain network without prompting by the bridge program.

13. The system of claim 1, wherein the bridge program is configured to be modified by (i) generating a new private key associated with a new wallet for the bridge program, (ii) modifying on-chain smart contracts on one or more of the first blockchain network and the second blockchain network with regard to the a new secret, and (iii) moving the first assets to the new wallet associated with the new private key.

14. System in claim 1, wherein the bridge program is configured to execute a cross-chain smart contract during a cross-chain asset transfer, wherein the cross-chain smart contract is executed inside a secure enclave; and
the cross-chain smart contract is configured to be used to perform on-chain operations on one or more of the first and second blockchain networks.

15. A method to bridge assets between blockchain networks, the method comprising:
providing, by a secure module, a trusted computing environment within which processing of programs is secure from observation and manipulation by other operations outside of the secure module;
loading, by the secure module, a bridge program from memory outside the secure module into secure memory within the secure module, the bridge program comprising instructions that, when executed by the secure module, cause the secure module to perform operations comprising:
accessing a first blockchain network that records transactions of first assets;
accessing a second blockchain network that records transaction of a second asset;
lock some of the first assets of the first blockchain network and correspondingly mint some of the second assets of the second blockchain network; and
unlock the locked first assets of the first blockchain network in response to removal of the minted second assets of the second blockchain network; and
maintaining, by each of a plurality of remote warden systems, a secret share of secret data for the bridge program to lock the first assets and to mint second assets, wherein the secret shares maintained by each of the remote warden systems are configured to be used in combination to regenerate a private key.

16. The method of claim 15, the method further comprising:
storing, by each of the plurality of remote warden systems, a portion of a pool of shared secrets that, collectively, are capable of being used to instantiate a new instance of the bridge program,
responsive to a determination that a first instance of the bridge program fails, providing, by each of the plurality of remote warden systems, the portion of the pool of shared secrets to a second instance of the bridge program upon instantiation; and
providing, by each of the plurality of remote warden systems, the portion of the pool of shared secrets to the second instance of the bridge program in response to the second instance of the bridge program being validated using an attestation operation by the remote warden systems.

17. The method of claim 16, the method further comprising providing, by each of the plurality of remote warden systems, information related to the first blockchain network and the second blockchain network to the second instance of the bridge program.

18. The method of claim 15, wherein:
the remote warden systems are configured to receive an encrypted transaction from the bridge to confirm asset operations were performed on the first blockchain network and the second blockchain network;
the bridge program is further configured to validate that the asset operations were successfully performed on the first blockchain network and the second blockchain network in response to receiving the confirmation from at least a threshold of the remote warden systems; and
the bridge program is further configured, upon restart, to request outstanding encrypted transactions for reissue to the warden systems.

19. The method of claim 18, wherein the threshold comprises at least a majority of the remote warden systems.

20. The method of claim 18, wherein:
the asset operations comprise the first assets being transferred to a wallet associated with the bridge on the first blockchain network; and
the bridge program is further configured to only mint the second assets in response to at least the threshold of the remote warden systems confirming that the firsts assets have been transferred to the wallet associated with the bridge in the first blockchain network; and the remote warden systems are configured to automatically notify the bridge program of the first assets being transferred to the wallet associated with the bridge in the first blockchain network without prompting by the bridge program.

* * * * *